US006417985B1

United States Patent
Noda

(10) Patent No.: US 6,417,985 B1
(45) Date of Patent: Jul. 9, 2002

(54) MAGNETIC DISK DRIVE

(75) Inventor: Shunji Noda, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/441,452

(22) Filed: Nov. 17, 1999

(30) Foreign Application Priority Data

Nov. 18, 1998 (JP) .......................................... 10-328658

(51) Int. Cl.[7] .............................................. G11B 5/012
(52) U.S. Cl. .................................................. 360/97.01
(58) Field of Search .......................... 360/97.01, 97.02, 360/97.03; 369/263

(56) References Cited

U.S. PATENT DOCUMENTS

| | | | | |
|---|---|---|---|---|
| 4,831,476 A | * | 5/1989 | Branc et al. ............. | 360/97.02 |
| 5,448,433 A | * | 9/1995 | Morehouse et al. ...... | 360/97.02 |
| 5,454,157 A | * | 10/1995 | Ananth et al. ................. | 29/603 |
| 5,500,779 A | * | 3/1996 | Diel ......................... | 360/97.01 |
| 5,510,954 A | * | 4/1996 | Wyler ......................... | 361/685 |
| 5,689,386 A | * | 11/1997 | Morehouse et al. ...... | 360/97.02 |
| 5,872,678 A | * | 2/1999 | Boigenzahn et al. .... | 360/97.01 |
| 6,005,768 A | * | 12/1999 | Jo ............................... | 361/685 |

FOREIGN PATENT DOCUMENTS

| | | |
|---|---|---|
| JP | 4-368690 | 12/1992 |
| JP | 6-176555 | 6/1994 |
| JP | 2594760 | 12/1996 |
| JP | 9-115279 | 5/1997 |

\* cited by examiner

Primary Examiner—A. J. Heinz
(74) Attorney, Agent, or Firm—Young & Thompson

(57) ABSTRACT

A magnetic disk drive is constructed by at least one magnetic disk, a spindle motor, an actuator containing a magnetic head, a flexible printed-circuit board and a package. Herein, mechanical parts are basically installed in a disk enclosure, while electronic parts are mounted on the package. A base of the magnetic disk drive is extended in both sides of the disk enclosure to provide multipurpose spaces, which are equipped with a shockabsorber mechanism for improvement of impact resistance and/or a heat-radiation mechanism for improvement of heat radiation. Herein, the package is stored in the multipurpose space, which is covered with a back cover being attached to the base of the magnetic disk drive. Thus, it is possible to reduce an overall thickness of the magnetic disk drive; it is possible to improve portability of the magnetic disk drive; and it is possible to prevent the electronic components from being damaged or subjected to electrostatic destruction. In addition, side rails are formed on exterior walls of the multipurpose spaces of the base, by which the magnetic disk drive is guided when being installed in a main device such as a personal computer and a server. Thus, it is possible to ease installation and extraction of the magnetic disk drive in the main device. Further, a rubber connector is provided for the package and is connected with a terminal of the main device with ease.

20 Claims, 15 Drawing Sheets

MAGNETIC DISK DRIVE

BACKGROUND OF THE INVENTION

1. Field of the Invention

This invention generally relates to magnetic disk drives, which drive spindle motors to rotate magnetic disks so that magnetic heads read and write information on the magnetic disks. Particularly, this invention relates to improvements in mechanical structures of the magnetic disk drives whose thickness is reduced and which are improved in impact resistance and heat radiation.

This application is based on Patent Application No. Hei 10-328658 filed in Japan, the content of which is incorporated herein by reference.

2. Description of the Related Art

First, a description will be given with respect to impact resistance of the conventional magnetic disk drives.

In general, the magnetic disk drives are very weak against impact being applied from the external. So, there is a possibility that the magnetic disk drives are remarkably reduced in life when human operators (or users) drop the magnetic disk drives on desks so that small impact of 100 G is applied to the magnetic disk drives. For this reason, in an event in which the user drops the magnetic disk drive from the desk to the floor so that large impact of 1000 G or more is applied to the magnetic disk drive, the magnetic disk drive may be fatally damaged.

There are two reasons why the magnetic disk drives have weakness against the impact, as follows:

A first reason is occurrence of jumping in which the magnetic head jumps due to impact being applied to the magnetic disk drive. In that case, the magnetic head hits a magnetic recording medium, so that a medium surface and the head are damaged. It is known that in general, the head is subjected to jumping due to impact of 100 G or so.

To avoid occurrence of the jumping of the head, the conventional technology employs a method to refuge the head outside of the medium at a stop mode of the magnetic disk drive. Even in such a method, however, it is unavoidable that a suspension portion for supporting the head is deformed and damaged due to impact of 1000 G or more.

A second reason is damageability in which a bearing of a spindle motor for rotating the medium is easily damaged.

In case of a ball bearing, for example, load corresponding to a product of "(impact acceleration)×(mass of body of revolution)" concentrates at the bearing. This causes impressions to be formed on a ball and its sliding surface.

To avoid the above problems, engineers discuss using pressure bearings as the bearings. The pressure bearing receives impact by "line contact", which approximates to "surface contact". As compared with the ball bearing, the pressure bearing is improved in impact resistance. Until now, however, the pressure bearing does not have sufficient reliability to accomplish required functions of the bearing. So, the present technology does not proceed to adoption of the pressure bearing to the magnetic disk drive. Even if the magnetic disk drive uses the pressure bearing, the pressure bearing merely provides impact resistance of several-hundreds G class. So, it cannot be said that the magnetic disk drive using the pressure bearing sufficiently overcomes large impact which exceeds 1000 G.

To cope with the aforementioned problems, engineers and scientists propose a variety of techniques with regard to shock absorber mechanisms of the magnetic disk drives.

For example, Japanese Patent Application, First Publication No. Hei 4-368690 discloses a magnetic disk drive, which is equipped with shock absorbers made of chloroprene rubber at four corners of a housing.

Japanese Patent No. 2594760 (corresponding to Japanese Patent Application, First Publication No. Hei 8-36873) discloses a magnetic disk drive equipped with shock absorbers (or bumpers) made of elastic material, which are installed in recesses formed at outer edge portions of a base of the magnetic disk drive.

In addition, Japanese Patent Application, First Publication No. Hei 6-176555 discloses a magnetic disk drive equipped with a shockabsorber added structure. Herein, shock absorbers are arranged at four corners of a frame as well as some portions in proximity to both ends of a connector receiving portion. Those shock absorbers damps impacts being applied to the magnetic disk drive. So, it is possible to prevent internal mechanical parts and members of the magnetic disk drive from being damaged.

Next, a description will be given with respect to measures against the heat that the magnetic disk drives generate. In general, the magnetic disk drive is constructed by a disk enclosure for installing mechanical parts such as a spindle motor and an actuator as well as a package for mounting electronic components used for control.

Among the aforementioned parts and components, main heating sources are the spindle motor, a coil portion of the actuator and IC parts such as control channels.

It is well known that if the magnetic disk drive operates for a long time, a surface temperature increases by 30 degrees or more. If a using environment is severe in temperature which exceeds 50 degrees (Celsius), there is a possibility in which temperature of the magnetic disk drive exceeds 80 degrees (Celsius). In such an high-temperature event, the magnetic disk drive is placed in an uncontrollable state, so it malfunctions.

To cope with the aforementioned problem, the conventional technology uses a fan which is arranged in a housing (or case) installing the magnetic disk drive. Using such a fan, the magnetic disk drive is cooled down to avoid temperature increase.

Japanese Patent Application, First Publication No. Hei 9-115279 discloses a magnetic disk drive equipped with heat conductive members as heat radiators. Herein, heat conductive members are tightly adhered to the package, disk enclosure and housing. Specifically, heat conductive sheets are inserted into a gap between the disk enclosure and electronic components on the package as well as a gap between the disk enclosure and a wall of a housing for installing the disk enclosure. Those sheets radiates heat of the package and heat of the disk enclosure due to thermal conductivity.

Next, a description will be given with respect to a conventional installation method for installing the package mounting electronic components in the disk enclosure.

The conventional 3.5-inch (or 2.5-inch) magnetic disk drives using 3.5 inch (or 2.5 inch) disks employ a specific structure for installation. For example, the magnetic disk drive disclosed by Japanese Patent Application, First Publication No. Hei 9-115279 employs a structure in which the package is attached to a back of the disk enclosure.

The aforementioned structure is subjected to standardization, which determines positions for screwing the disk enclosure on the housing and a position for arranging a connector on the package. Thus, it is possible to install the magnetic disk drives in spaces, which are prepared in advance in personal computers and servers, with compatibility.

In general, the packages are uncovered. So, users are able to directly touch important electronic components of the packages.

As described above, the 3.5-inch (or 2.5-inch) magnetic disk drives are standardized in structures for installation in the housings (or main bodies). So, the magnetic disk drives are tightly screwed on the housings.

In the case of the personal computers, the magnetic disk drives are fixed to sheet metals of the housings by screws, so they are installed in the housings. In the case of the servers, the magnetic disk drives are fixed to racks exclusively used for installation of the magnetic disk drives by screws, then, the racks are inserted into the servers.

The packages normally use SCSI connectors or IDE connectors (where "SCSI" is an abbreviation for "Small Computer Systems Interface", while "IDE" is an abbreviation for "Integrated Device Electronics"). Those connectors are not designed in consideration of repetition of insertion and extraction which are repeated many times. So, they are connected to the hard disk drives with very strong connecting forces.

The aforementioned conventional techniques regarding the hard disk drives suffer from problems as follows:

A first problem is incapability to obtain a sufficient damping effect against impact. That is, the magnetic disk drive disclosed by Japanese Patent Application, First Publication No. Hei 6-176555 use "small" shock absorbers, which are incapable of sufficiently absorbing (or eliminating) large impact being applied thereto.

To secure sufficient largeness of the shock absorbers, the "large" shock absorbers suppress spaces used for mechanical parts in the disk enclosure. For example, a magnetic circuit must be reduced in size in proximity to a corner used for installation of the actuator in the disk enclosure. This deteriorates seek characteristic of the magnetic disk drive.

Another corner aside the medium is a space for installation of an air filter in the disk enclosure. If the shock absorbers are enlarged, it becomes impossible to install the air filter in that corner of the disk enclosure.

A second problem is occurrence of noise and vibration in the magnetic disk drive equipped with a fan. Using the fan, it is possible to cool down the magnetic disk drive. However, the fan inevitably causes noise and vibration to occur.

Normally, the personal computers and severs placed in offices do not have difficulty due to the noise. However, the personal computers for home use may sometimes suffer from the difficulty due to the noise. Recently, the users frequently connect the magnetic disk drives to audio/visual devices. In that case, the noise may be a fatal drawback.

The vibration causes low-frequency noise, which forms an external disturbance for positioning of the head of the magnetic disk drive. Recently, the magnetic disks are advanced to have high densities in which tracks are formed with small pitches. This demands high positioning performance for the magnetic disk drives. For this reason, if the disturbance for normally causing vibration exists in proximity to the magnetic disk drive, it causes a great difficulty in improvement of performance of the magnetic disk drive.

Further, the magnetic disk drive disclosed by Japanese Patent Application, First Publication No. Hei 9-115279 uses the sheets exclusive used for thermal conductivity, which raise the total cost in manufacture.

A third problem is difficulty in reduction of thickness of the magnetic disk drive as a whole. That is, it is difficult to reduce the thickness of the magnetic disk drive, in which the disk enclosure and the package mounting the electronic components are arranged in a laminated-structure manner.

Due to the laminated structure, it is difficult to radiate heat from the disk enclosure and package respectively. Because, the disk enclosure and package are arranged such that heat-radiating surfaces thereof are opposite to each other, which causes heat accumulation to easily occur in a space between the heat-radiation surfaces. Herein, heat-radiation area is reduced because the heat-radiating surfaces are arranged opposite to face with each other.

In addition, the laminated structure are disadvantageous in that the electronic components are easily damaged. Further, the magnetic disk drive employing the laminated structure is not a good item for merchandise because the user may feel it unattractive while the user may have a difficulty to handle it.

Mainly because, the package mounting the electronic components are exposed. So, electrostatic destruction is easily caused to occur when the user directly touches the electronic components.

Because of exposure of the electronic components, the magnetic disk drive is not good in appearance as merchandise. In addition, the user feels difficulty to handle it with his or her hand(s). If the 2.5-inch (or 3.5-inch) magnetic disk drives storing large capacity of files are advanced to have portability in the future, the laminated structure cannot provide the magnetic disk drives with attraction to the consumers in merchandise.

A fourth problem is difficulty in installation and extraction of the magnetic disk drives. That is, it is not easy for the users to install or extract the magnetic disk drives in main bodies of the personal computers and servers.

Because, the magnetic disk drives are fixed to the main bodies of the personal computers by use of screws, while the connectors normally used for connections between the magnetic disk drives and personal computers have great strength of connection.

Conventionally, once the magnetic disk drive is installed in the main body, it is rarely extracted from the main body only when failure occurs on the personal computer or only when the user installs some board or unit more than the boards and units being installed in the personal computer in advance. So, the standardization is made with respect to the conventional magnetic disk drives in consideration of the aforementioned conditions.

In the future, the magnetic disk drives tend to be used as storage of video files or else. In that case, it is possible to propose new uses for the magnetic disk drives, in which magnetic disk drives of large capacities are used as "portable" devices. By the way, the magnetic disk drives of the card type (e.g., PCMCIA cards, TYPE 2, where "PCMCIA" is an abbreviation for "Personal Computer Memory Card International Association") are known as magnetic disk drives of the portable type. However, those magnetic disk drives have problems due to lack of capacities. Therefore, it is demanded to provide brand-new magnetic disk drives of the 2.5-inch class, 3.5-inch class or larger classes, which are designed to be of the portable type and which can be easily installed or extracted in the personal computers and the like.

SUMMARY OF THE INVENTION

It is an object of the invention to provide a magnetic disk drive having high impact resistance as well as high thermal radiation which eliminates necessity of installation of thermal conductive members and fan.

It is another object of the invention to provide a "portable" magnetic disk drive of large capacity having a reduced thickness and a well considered structure, by which electronic components are hard to be damaged.

It is a further object of the invention to provide a magnetic disk drive having an attractive look and an easy-to-handle structure as merchandise, which can be easily installed or extracted in a personal computer or else.

The magnetic disk drive is basically constructed by at least one magnetic disk, a spindle motor, an actuator containing a magnetic head, a flexible printed-circuit board and a package. Herein, mechanical parts are basically installed in a disk enclosure, while electronic parts are mounted on the package.

A magnetic disk drive of this invention is characterized by that a base is extended in both sides of the disk enclosure to provide multipurpose spaces, which are equipped with a shockabsorber mechanism for improvement of impact resistance and/or a heat-radiation mechanism for improvement of heat radiation. The package is stored in the multipurpose space, which is covered with a back cover being attached to the base of the magnetic disk drive. Thus, it is possible to reduce an overall thickness of the magnetic disk drive; it is possible to improve portability of the magnetic disk drive; and it is possible to prevent the electronic components from being damaged or subjected to electrostatic destruction.

In addition, side rails are formed on exterior walls of the multipurpose spaces of the base, by which the magnetic disk drive is guided when being installed in a main device such as a personal computer and a server. Thus, it is possible to ease installation and extraction of the magnetic disk drive in the main device. Further, a rubber connector is provided for the package and is connected with a terminal of the main device with ease.

Incidentally, the main device is equipped with an installation mechanism, which assists installation (and extraction) of the magnetic disk drive. Herein, the installation mechanism is constructed by a pair of guides, a pair of anti-insertion pins, a pair of eject springs and a pair of clampers. Herein, the guides are used to guide the side rails of the magnetic disk drive being inserted into the main device. The dampers are manually revolved to lock or unlock motion of the magnetic disk drive in the main device.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENTS

This invention will be described in further detail by way of examples with reference to the accompanying drawings.

Figure 1A:
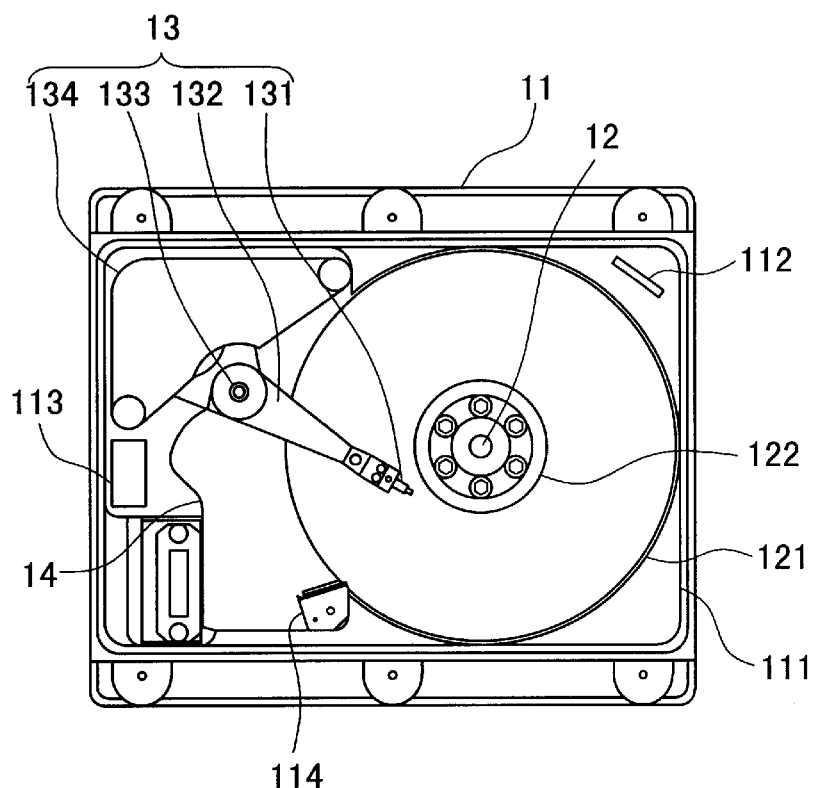
FIG. 1A is a plan view showing a magnetic disk drive, which is uncovered, in accordance with embodiment 1 of the invention.
Figure 1B:
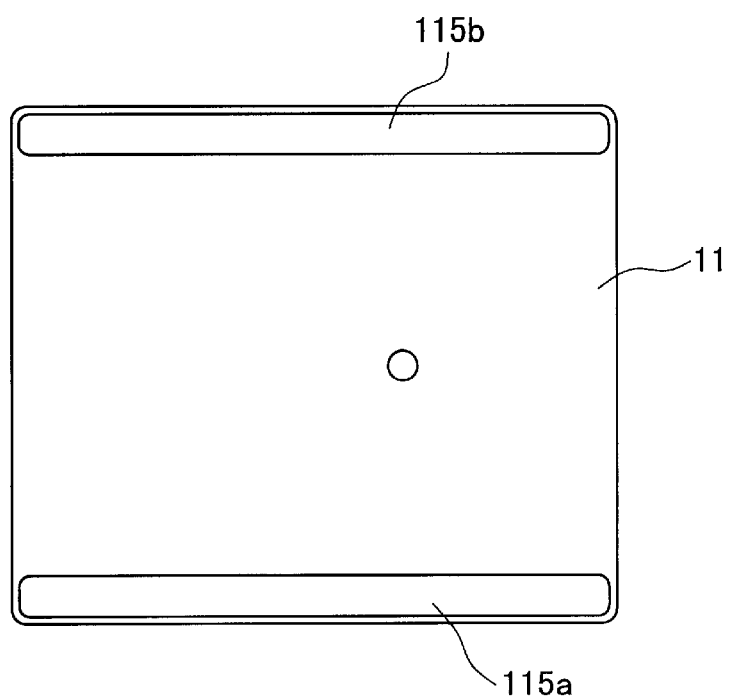
FIG. 1B is a bottom view showing a back of a base of the magnetic disk drive of FIG. 1A.

Now, a description will be given with respect to a magnetic disk drive in accordance with embodiment 1 of the invention with reference to FIGS. 1A and 1B. Specifically, FIG. 1A is a plan view showing the magnetic disk drive equipped with at least one magnetic disk (or medium), while FIG. 1B is a bottom view of the magnetic disk drive. For convenience' sake, FIGS. 1A and 1B show illustrations of the magnetic disk drive, which is uncovered.

A base 11 of the magnetic disk drive is equipped with a spindle motor 12, an actuator 13 and a flexible printed-circuit board (FPC) 14.

A medium (or magnetic disk) 121 is attached to a spindle of the spindle motor 12 with a clamp ring 122.

The actuator 13 is constructed by a (magnetic) head 131, a multi-arm 132, a pivot bearing 133 and a voice coil motor 134.

The flexible printed-circuit board 14 is fixed to the actuator 13 and the base 11. The flexible printed-circuit board 14 performs communications with regard to positioning information as well as recording signals and reproduced signals of the head 131.

Other than the aforementioned elements, the magnetic disk drive is also equipped with a gasket 111 for enclosing the aforementioned mechanical parts, an air filter 112 for removing dust and silicagel 113 for controlling humidity as usual.

Recently, the magnetic disk drives are frequently equipped with head load/unload mechanisms, which refuge heads outside the media at stop mode. So, a head refuge lamp 114 is arranged aside the medium 121.

The aforementioned elements and parts are basically identical to those conventionally used for the magnetic disk drives.

The magnetic disk drive of the present embodiment is characterized by extending the base 11, equipped with the aforementioned parts, in both sides to provide multipurpose spaces 115a, 115b.

An overall space of the base is subjected to partitioning using walls, so that an area for installing the aforementioned mechanical parts is separated from the multipurpose spaces 115a, 115b by the walls.

The multipurpose spaces 115a, 115b can be used for multiple purposes. So, those spaces are designed to have a damper function for improvement of the impact resistance or a heat-radiation mechanism for prevention of temperature increase. Or, they can be used for installation of the package, which is conventionally attached to the back of the disk enclosure.

Figure 2A:
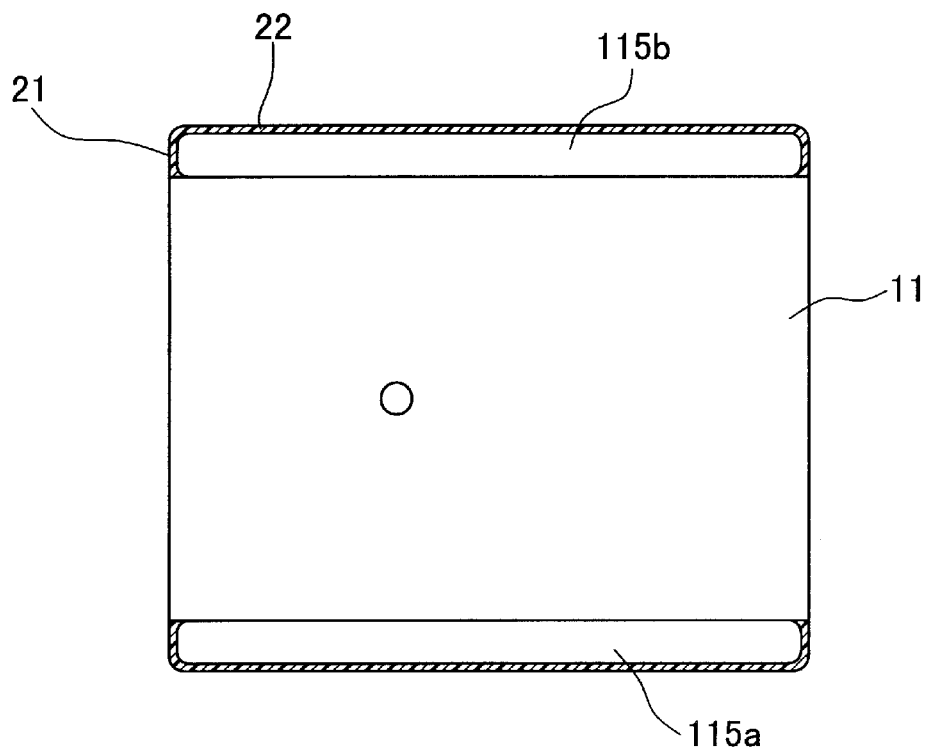
FIG. 2A is a bottom view showing a back of a base of a magnetic disk drive in accordance with embodiment 2 of the invention.

Embodiments 2 and 3 are designed to provide the spaces 115a, 115b with the damper function for improvement of the impact resistance and are described with reference to FIGS. 2A and 2B.

FIG. 2 is a bottom view showing a base (11) of a magnetic disk drive in accordance with the embodiment 2. Herein, rubber members are used as shock absorbers.

Specifically, a rubber damper 21 and a bumper frame 22 are integrally formed together with each of the spaces 115a, 115b of the base 11. They are provided to ease impact being applied to the magnetic disk drive.

Figure 2B:
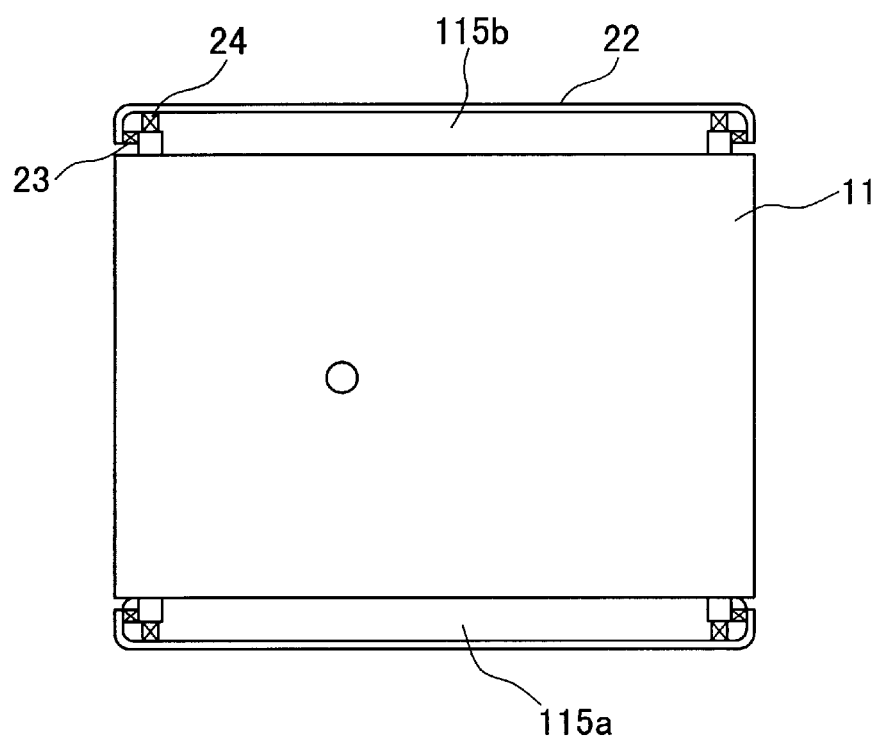
FIG. 2B is a bottom view showing a back of a base of a magnetic disk drive in accordance with embodiment 3 of the invention.

FIG. 2B is a bottom view showing a base (11) of a magnetic disk drive in accordance with the embodiment 3. Herein, springs are used as shock absorbers.

Specifically, a bumper frame 22 is attached to each space of the base 11 by way of an X-direction spring 23 and a Y-direction spring 24.

The aforementioned embodiments 2 and 3 are characterized by that the shock absorbers can be designed without consideration of the standard scales and dimensions. In addition, it is possible to secure a sufficient amount of impact resistance.

In order to secure sufficiently large sizes of the shock absorbers in the magnetic disk drive having the standard dimensions, the shock absorbers should suppress spaces for installation of the mechanical parts in the disk enclosure. For example, magnetic circuit(s) should be reduced at a corner of the base installing the actuator. This deteriorates seek characteristic of the magnetic disk drive. In addition, an air filter cannot be installed in a corner of the base aside the medium, in which it is conventionally installed.

The embodiments 2 and 3 are capable of providing normal spaces for installation of the actuator and spindle motor. Therefore, provision of the shock absorbers does not damage fundamental performance of the magnetic disk drive.

Embodiments 4 and 5 are designed to provide the spaces 115a, 115b with the heat-radiation function for prevention of the temperature increase and are described with reference to FIGS. 3A and 3B.

Figure 3A:
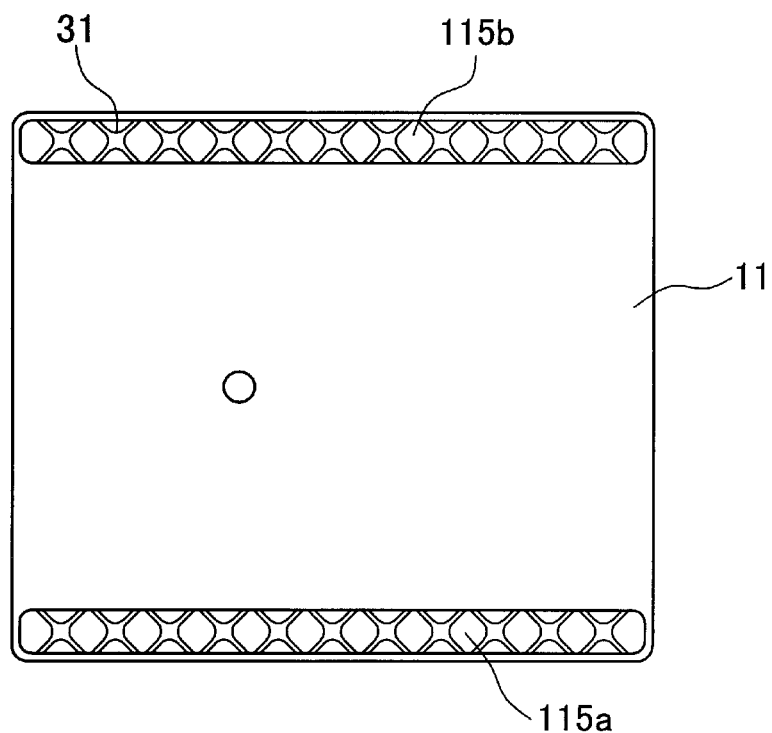
FIG. 3A is a bottom view showing a back of a base of a magnetic disk drive in accordance with embodiment 4 of the invention.

FIG. 3A is a bottom view showing a base (11) of a magnetic disk drive in accordance with the embodiment 4. Herein, a heat-radiation frame 31 is formed with respect to each of the spaces 115a, 115b of the base 11 as the heat-radiation mechanism.

Figure 3B:
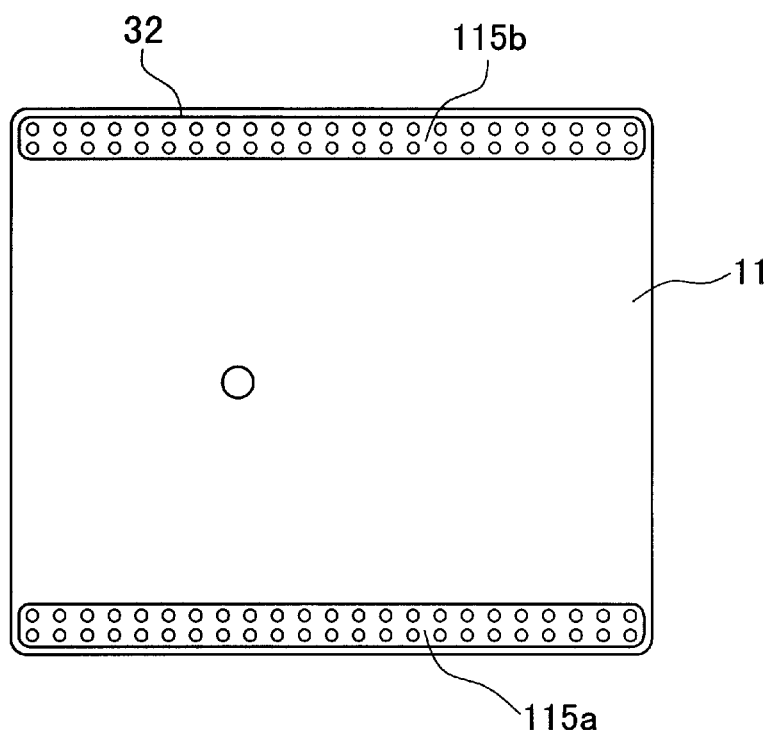
FIG. 3B is a bottom view showing a back of a base of a magnetic disk drive in accordance with embodiment 5 of the invention.

FIG. 3B is a bottom view showing a base (11) of a magnetic disk drive in accordance with the embodiment 5. Herein, columnar projections "32" are formed on a surface of each space of the base 11 as the heat-radiation mechanism.

The aforementioned heat-radiation frame 31 and the columnar projections 32 of the embodiments 4 and 5 can be easily formed on the bases of the magnetic disk drives, which are manufactured by die casting.

Both of the embodiments 4 and 5 are capable of increasing base surface areas multiple times larger than the magnetic disk drives having standard dimensions being equipped with the heat-radiation mechanisms. Thus, it is possible to provide an excellent base structure which is superior in heat radiation.

Incidentally, the embodiments 4 and 5 merely show examples of heat-radiation structures using the multipurpose spaces 115a, 115b of the base 11. So, it is possible to propose other structures to broaden the base surface areas. All of remaining embodiments are proposed in connection with such structures.

Next, a description will be given with respect to a magnetic disk drive in accordance with embodiment 6, which is characterized by that the spaces 115a, 115b are used for installation of the package mounting electronic components.

Figure 4A:
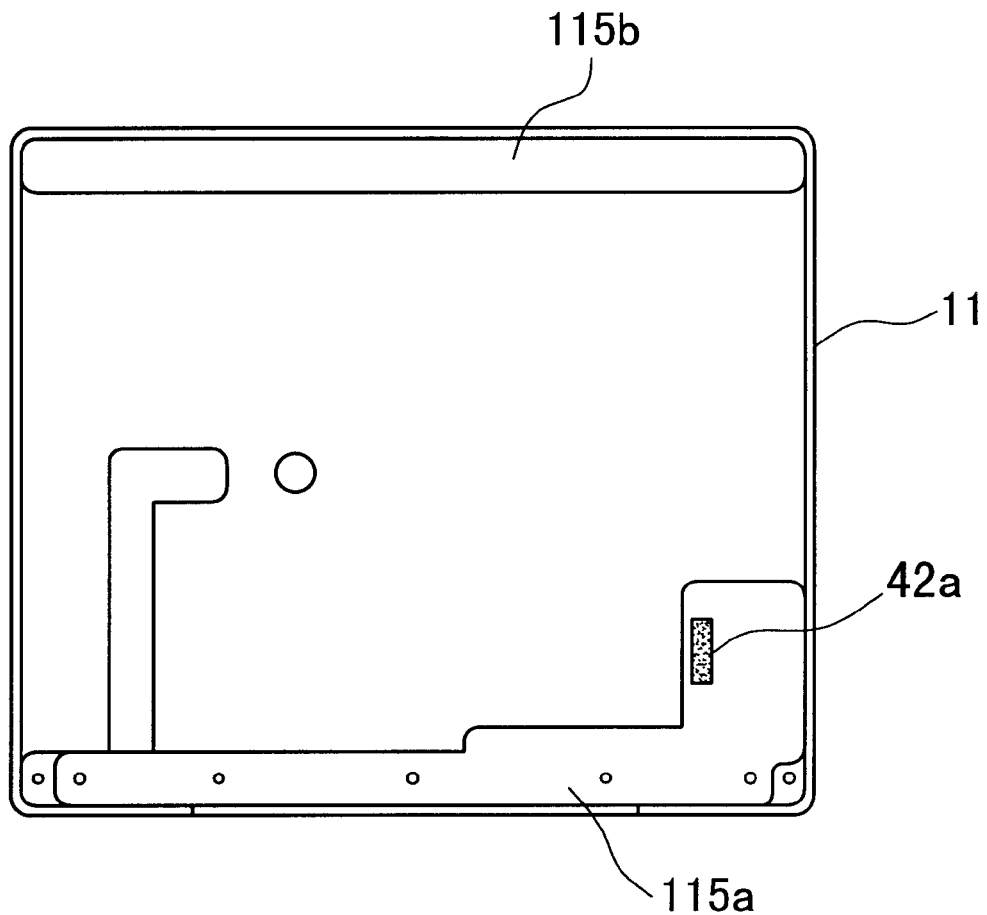
FIG. 4A is a bottom view showing a back of a disk enclosure of a magnetic disk drive in accordance with embodiment 6 of the invention.
Figure 4B:
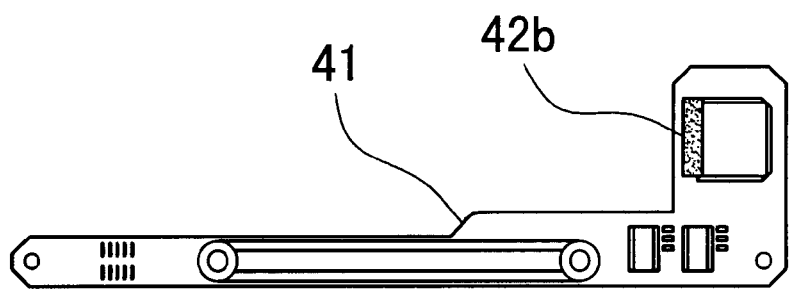
FIG. 4B is a plan view showing an appearance of a package mounting electronic components.

FIG. 4A shows a back of a disk enclosure of the magnetic disk drive in accordance with the embodiment 6, while FIG. 4B shows an appearance of a package 41 mounting electronic components. In addition, FIG. 5A shows the disk enclosure being equipped with the package 41, while FIG. 5B shows a back cover 43 which is attached to the disk enclosure.

Figure 5A:
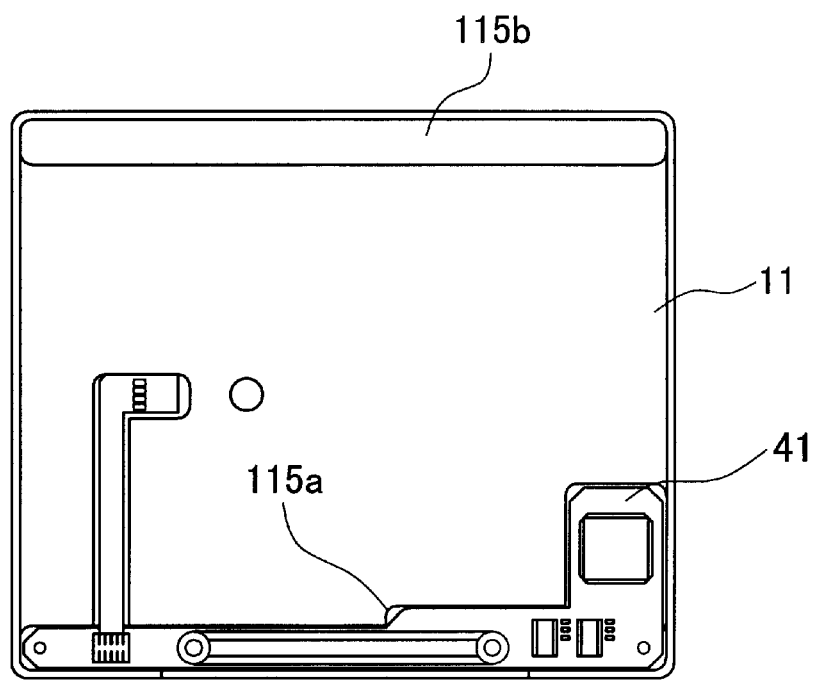
FIG. 5A is a bottom view of the disk enclosure of FIG. 4A being equipped with the package of FIG. 4B.
Figure 5B:
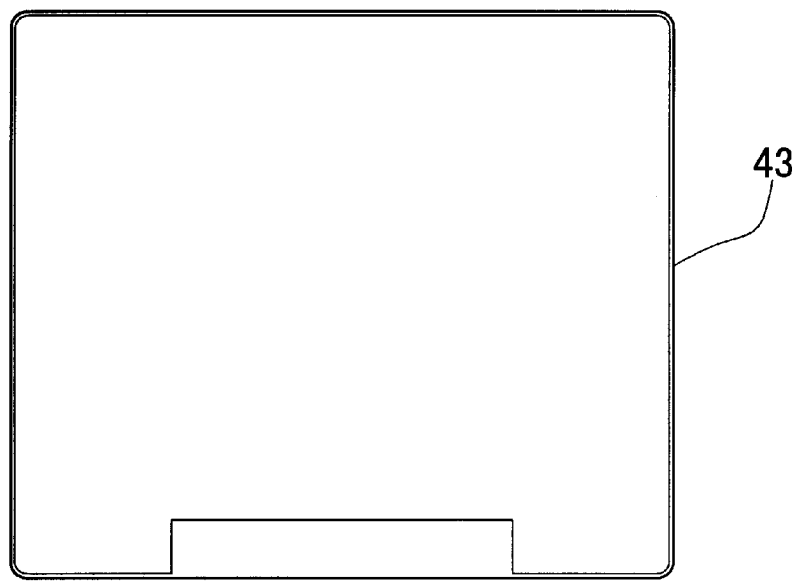
FIG. 5B is a bottom view of the disk enclosure of FIG. 4A to which a back cover is attached.

As shown in FIG. 5A, the magnetic disk drive of the embodiment 6 is characterized by that the package 41 is stored in the space 115a. Herein, the package 41 can be fixed to the base 11 by screws, or it can be pressed into the space 115a by a back cover 43.

The package 41 is connected to the flexible printed-circuit board 14 by connectors 42a, 42b.

According to the aforementioned structure of the magnetic disk drive, the package 41 is completely stored in the space 115a and is covered with the back cover 43. So, the package 41 is not exposed to the external. This eliminates a possibility in which the user directly touches the electronic components mounted on the package 41. Therefore, the electronic components of the package 41 are hard to be damaged by electrostatic destruction or else. In addition, the present magnetic disk drive has an attractive look in appearance because the electronic components are not exposed to the external. Further, it is easy and comfortable for the user to handle the magnetic disk drive with his or her hand(s).

Figure 6A:
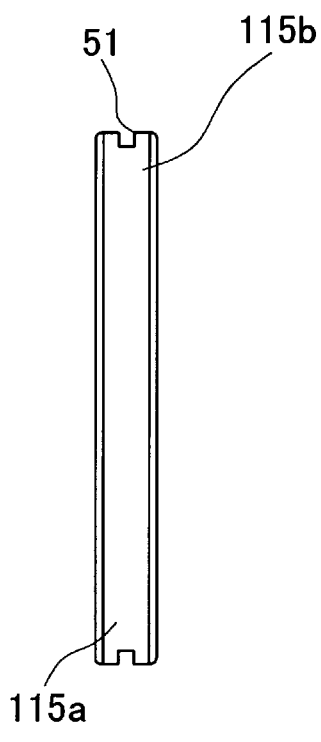
FIG. 6A is a side view showing a side rail attached to exterior walls of spaces of a base of a magnetic disk drive in accordance with embodiment 7 of the invention.
Figure 6B:
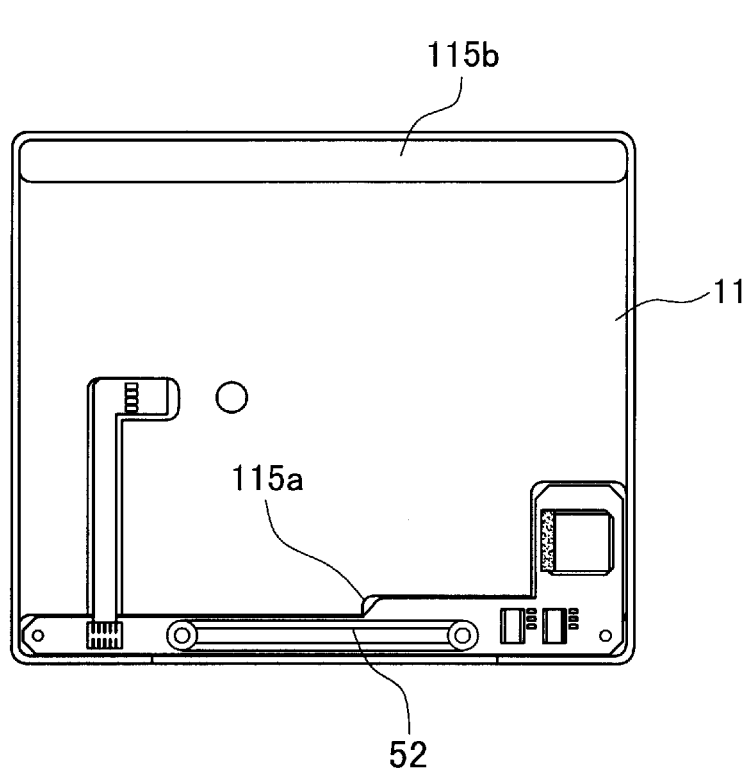
FIG. 6B is a bottom view showing the base of the magnetic disk drive of the embodiment 7.

With reference to FIGS. 6A and 6B, a description will be given with respect to a magnetic disk drive of embodiment 7 having spaces 115a, 115b, which can be easily installed or extracted in a main body of a personal computer or else (hereinafter, simply referred to as a main device).

Specifically, a side rail (or guide) 51 shown in FIG. 6A is attached to each of exterior walls of the spaces. Thus, the magnetic disk drive of the embodiment 7 is inserted into the main device by way of the side rails 51. Herein, it is preferable to use resin material having a high sliding capability for formation of the side rail. However, if the main device is equipped with a guide made of material having a high sliding capability, the side rail can be formed by the same material used for formation of the base 11. In general, the base 11 is made of aluminum.

FIG. 6A shows one example of the side rail 51 that has a rectangle-U-shaped form with cutouts. It is possible to use a variety of shapes for the side rail, such as a V-shaped channel and a flat-plane shape.

Incidentally, it is preferable to use a rubber connector 52 shown in FIG. 6B for input and output of signals between the magnetic disk drive and main device.

As described before, the conventional magnetic disk drives normally use the SCSI connectors or IDE connectors. However, those connectors are not designed in consideration of severe usage in which they are subjected to insertion and extraction many times. Therefore, the connectors are normally connected to the magnetic disk drives with very strong force, so the users are not able to easily install and extract the magnetic disk drives in the personal computers and the like.

In contrast to the aforementioned connectors, the rubber connectors are designed such that they can be easily connected to the magnetic disk drives by merely pressing pad terminals against silicon rubber members. So, it is possible to easily install and extract the magnetic disk drive in the main device, which is equipped with a press/release mechanism for the rubber connector(s).

The rubber connectors made of silicon material are generally sold on the market and are widely used in a variety of fields such as internal parts of cellular phones, other than the magnetic disk drives.

Next, a description will be given with respect to a magnetic disk drive in accordance with embodiment 8, which is characterized by providing the spaces 115a, 115b with damper functions for improvement of impact resistance.

Figure 7A:
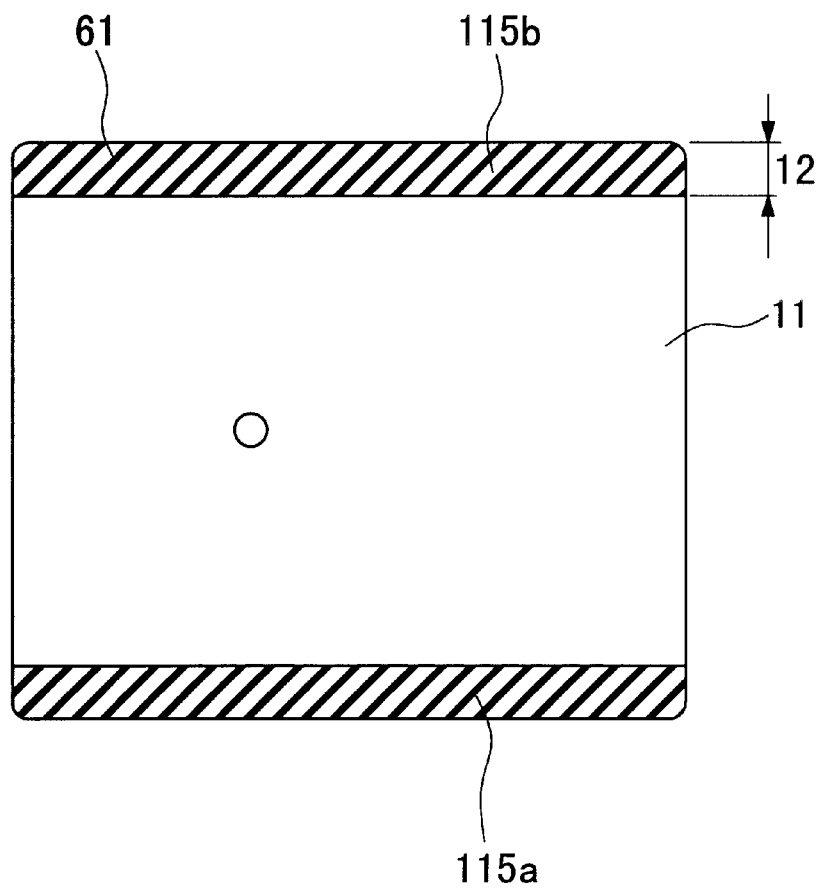
FIG. 7A is a bottom view showing a base of a magnetic disk drive having spaces, to which shock absorbers are attached, in accordance with embodiment 8 of the invention.
Figure 7B:
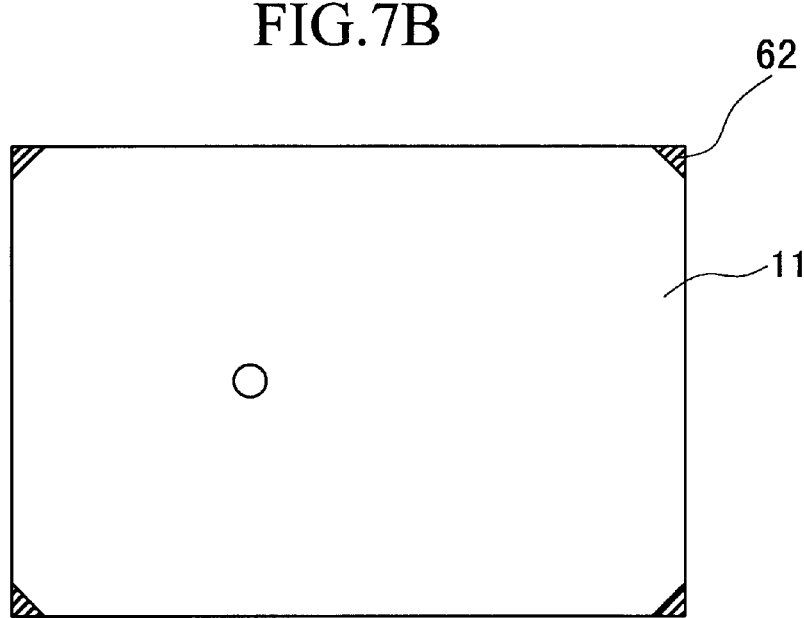
FIG. 7B is a bottom view showing a base of the conventional magnetic disk drive having four corners, to which shock absorbers are attached respectively.

FIG. 7A diagrammatically shows the magnetic disk drive of the embodiment 8, which is equipped with shock absorbers "61", made of natural rubber, with respect to the spaces 115a, 115b respectively. For comparison with the embodiment 8 of FIG. 7A, FIG. 7B shows an example of the conventional magnetic disk drive, which is equipped with shock absorbers 62 at four corners of the base within the standard dimensions.

It is possible to arbitrarily set dimensions of the shock absorbers attached to the spaces 115a, 115b. The embodiment 8 sets a width of the shock absorber 61 at 12 mm or so in consideration of the portability of the magnetic disk drive. Herein, the magnetic disk drive of the embodiment 8 has roughly a same size and a same external shape in plane of the CD-ROM case.

Within the standard dimensions, the conventional magnetic disk drive has a limit in sizes of the shock absorbers, each of which is formed in a triangle shape whose side is 3 mm or so.

Figure 8:
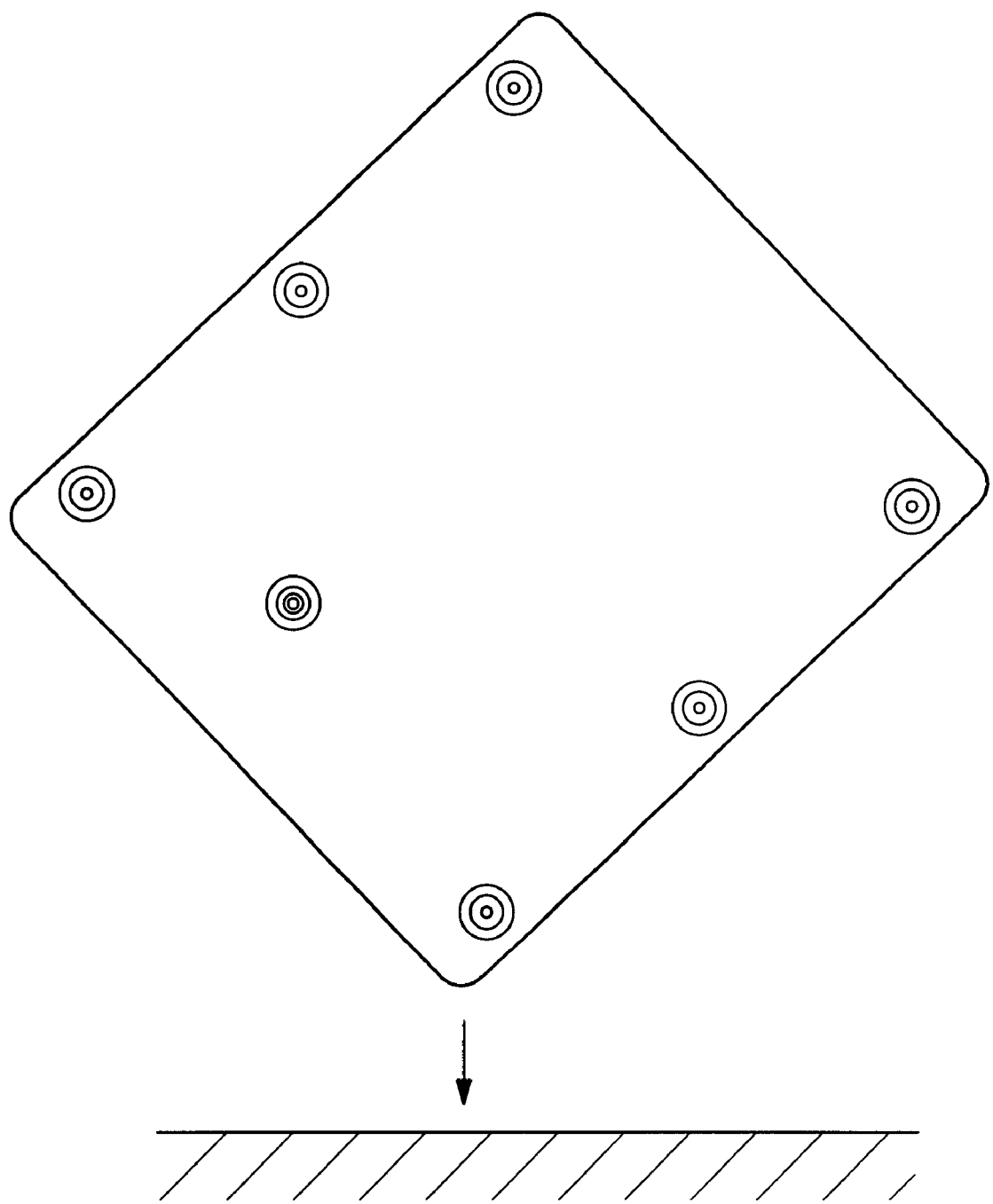
FIG. 8 is a schematic illustration showing an event in which a magnetic disk drive is dropped on a floor in a drop test.

Next, a description will be given with respect to results of comparison in shock-elimination capabilities of the aforementioned magnetic disk drives, each of which is dropped on a floor or else as shown in FIG. 8.

Suppose that drop impact is represented by a half sine wave whose duration corresponds to 0.5 ms and whose magnitude is 1000 G, which is equivalent to impact being caused when an object is dropped from the desk onto the carpet floor, for example.

In addition, impact acceleration has frequency distribution which has a peak at 1000 Hz (=1/0.001).

The shock absorber is designed to have a spring constant, by which a frequency band has a damping coefficient (or damping constant) of 0.1.

In general, a system has a specific relationship between an input frequency and a damping coefficient, which is given by a relational expression, as follows:

$$\left|\frac{1}{1-(f/fn)^2}\right| = Tr \qquad (1)$$

where f denotes input frequency, fn denotes characteristic frequency, and Tr denotes damping coefficient.

Using "f=1000 Hz" and "Tr=0.1", the aforementioned relational expression (1) is expanded to calculate the characteristic frequency fn, as follows:

$$fn = 302 \text{ Hz} \qquad (2)$$

In this case, a spring constant "K" being required for the shock absorber is given by an equation, as follows:

$$K = (2\Pi fn)^2 \cdot M \qquad (3)$$

where M denotes a mass of the magnetic disk drive. Herein, the mass M of the magnetic disk drive is approximately 0.3 kg, so the spring constant K is calculated using the equations (2) and (3), as follows:

$$K = 1080 \text{ N/mm}$$

Therefore, material for the natural rubber is selected to meet the aforementioned spring constant. Thus, it is expected that the shock absorbers demonstrate a good shock-elimination capability.

Next, a deflection value is calculated with respect to the shock absorber. If the magnetic disk drive is dropped with impact of 1000 G, load being applied to the shock absorber (s) is given as follows:

$$1000 \cdot M \cdot 9.8 = 2940 \text{ N}$$

In this case, the deflection value is given as follows:

$$2940/K = 2.7 \text{ mm}$$

It is a problem whether the shock absorbers are capable of providing a margin (or room) of deflection corresponding to the calculated deflection value (i.e., 2.7 mm) or not. If the spaces 115a, 115b are filled with shockabsorber material as shown in FIG. 7A, it is possible to provide a large thickness of the shock absorber 61, which is 12 mm or so. In this case, the aforementioned deflection value merely corresponds to relatively small deformation of the shock absorber, which is 20% or so. Therefore, it is possible to sufficiently demonstrate the required spring characteristic.

In the case of the shock absorbers (62) which are attached to the four corners of the base of the magnetic disk drive within the standard dimensions as shown in FIG. 7B, each of the shock absorbers merely has a thickness of 3 mm or so. So, the shock absorber 62 is incapable of deflecting by 2.7 mm while maintaining the spring characteristic.

In short, as compared with the conventional design, the present embodiment is superior in shock-elimination capability.

Therefore, using the multipurpose spaces 115a, 115b provide remarkable improvement in impact resistance.

Next, a description will be given with respect to magnetic disk drives, each of which is equipped with a heat-radiation structure. Specifically, the heat-radiation structure is provided for the spaces 115a, 115b to avoid temperature increase.

Figure 9A:
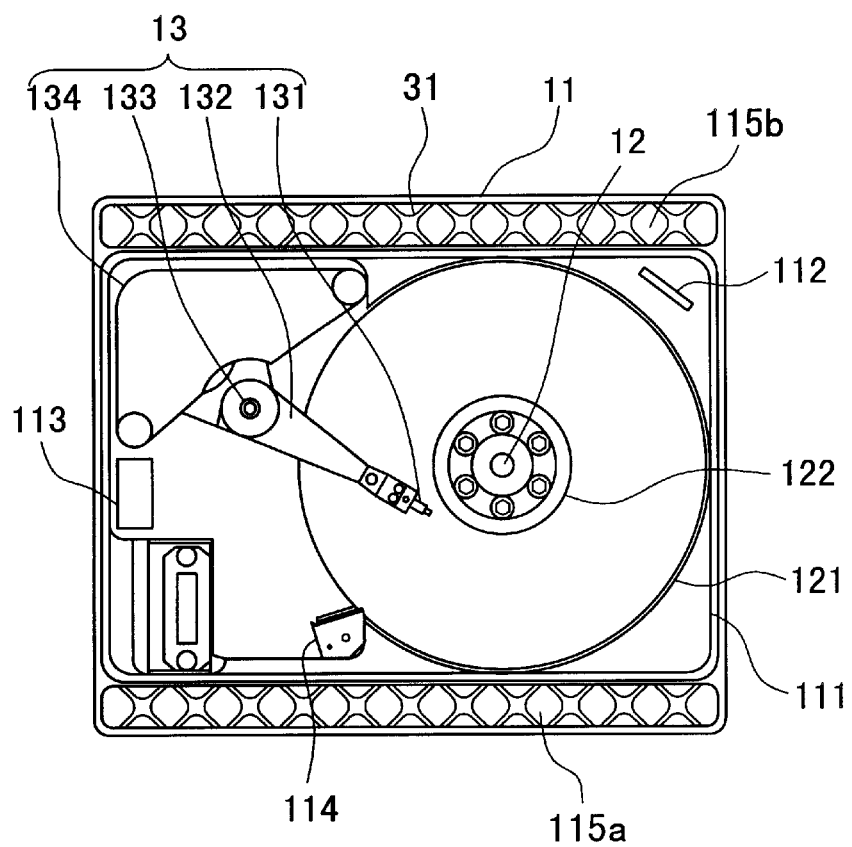
FIG. 9A is a plan view showing the magnetic disk drive of the embodiment 4, which is uncovered and which is equipped with a heat-radiation structure in spaces.

FIG. 9A shows the magnetic disk drive of the foregoing embodiment 4 (see FIG. 3A), which is equipped with a heat-radiation frame 31 on each of the spaces 115a, 115b.

Figure 9B:
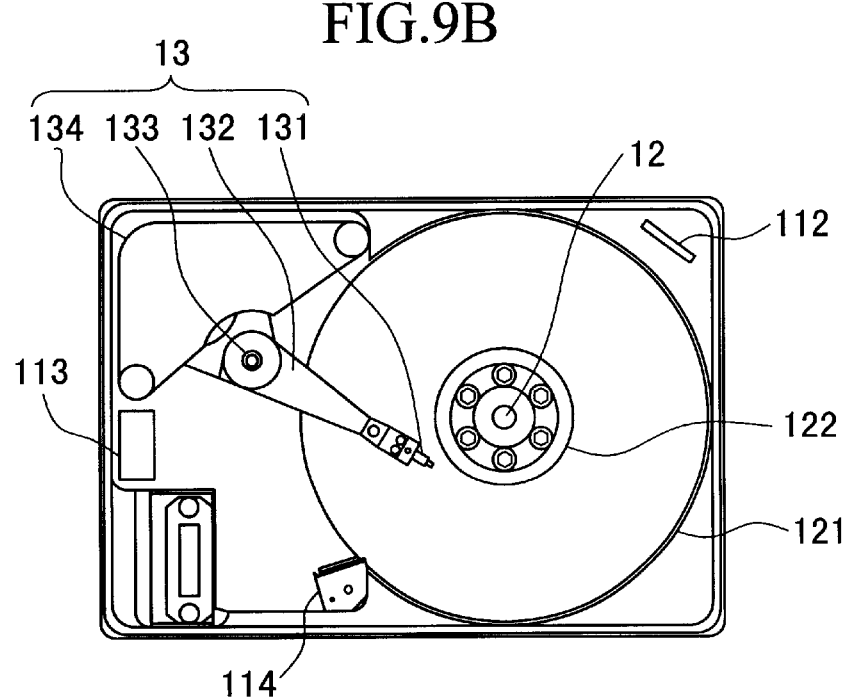
FIG. 9B is a plan view showing the conventional magnetic disk drive, which is uncovered and which is to be compared with the magnetic disk drive of FIG. 9A with respect to heat-radiation capabilities.

As a comparative example, FIG. 9B shows the conventional magnetic disk drive. Herein, comparison is made between the magnetic disk drives of FIGS. 9A and 9B with respect to surface areas being exposed to the external air.

Comparison results show that the surface area of the magnetic disk drive of FIG. 9A being exposed to the external air can be increased two times larger than the surface area of the conventional magnetic disk drive of FIG. 9B being exposed to the external air.

The inventor of this invention makes thermal analysis, under prescribed conditions, with respect to the aforementioned magnetic disk drives. Herein, one condition for the thermal analysis is that the spindle motor is regarded as a heating source of 80 degrees Celsius. So, comparison is made between the magnetic disk drives with respect to their surface temperatures. Results of the thermal analysis are as follows:

That is, the results show that the surface temperature of the magnetic disk drive of the embodiment 4 can be suppressed at 55 degrees Celsius or so while the surface temperature of the conventional magnetic disk drive increases to 65 degrees Celsius or so.

As described above, it is possible to improve a temperature increase suppression effect by using the multipurpose spaces 115a, 115b.

Next, a description will be given with respect to installation of the package 41 mounting electronic components, which is used by the foregoing embodiment 6 (see FIG. 4B), in the spaces 115a, 115b.

Figure 10A:
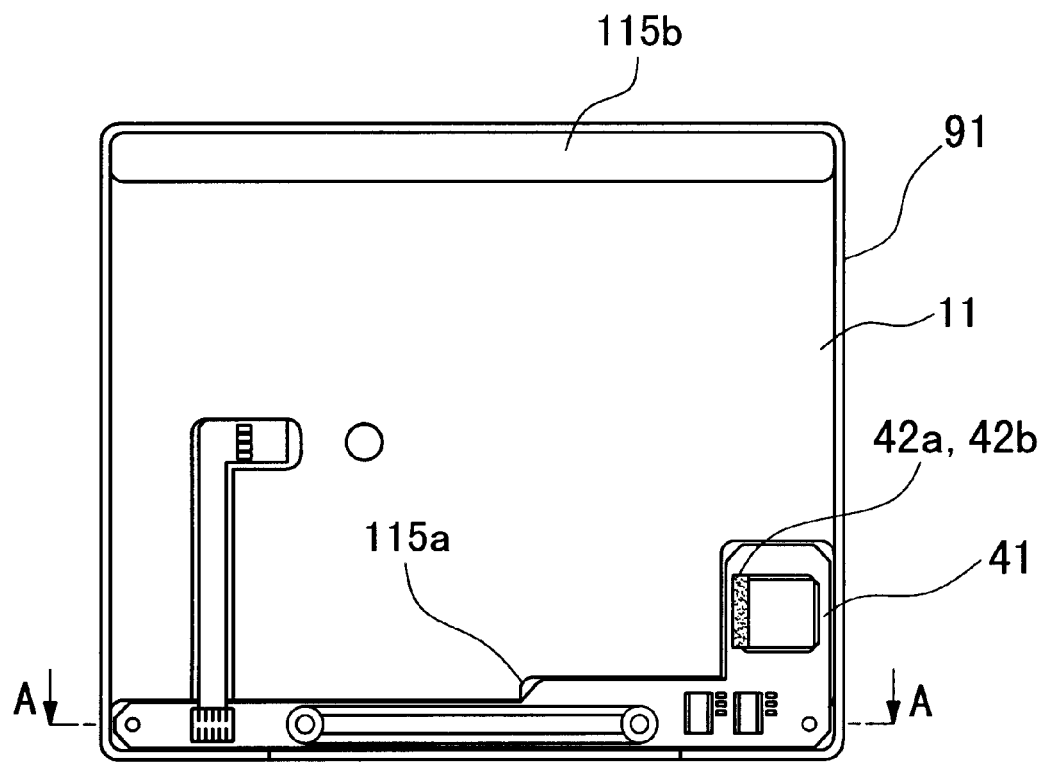
FIG. 10A is a bottom view showing the base of the magnetic disk drive of the embodiment 6, in which a package is installed in a space of a disk enclosure.
Figure 10B:
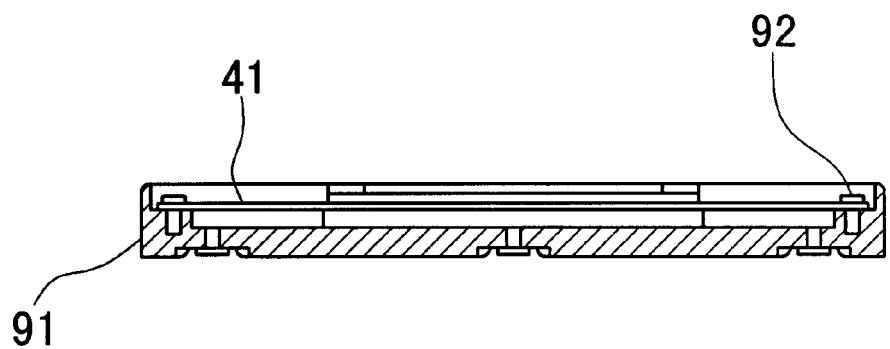
FIG. 10B is a cross sectional view taken along line A—A of FIG. 10A.

FIGS. 10A and 10B show that the package 41 of the embodiment 6 is installed in a disk enclosure 91.

Specifically, FIG. 10A is a bottom view showing the base 11 of the magnetic disk drive in which the package 41 is installed in the disk enclosure 91, while FIG. 10B shows a cross section with regard to the package 41 and the disk enclosure 91.

In the above, the installation is performed such that the package 41 is dropped down into a sinkhole being formed inside of the space 115a of the disk enclosure 91.

A signal path between the package 41 and the disk enclosure 91 is established by connecting a connector 42a of the package 41 and a connector 42b of the disk enclosure 91 together.

Incidentally, the package 41 is fixed to the space 115a by screws 92.

The aforementioned magnetic disk drive of FIGS. 10A and 10B is different from the conventional magnetic disk drive in which the package is attached to the back of the disk enclosure in a laminated-structure manner. Thus, the present magnetic disk drive is capable of reducing thickness thereof in installation by thickness of the package.

So, it is possible to obtain a thickness reduction effect, by which an overall thickness of the magnetic disk drive is reduced by the thickness of the package, which is 5 mm or so in general.

In the present magnetic disk drive, the disk enclosure 91 and the package 41 are subjected to alignment horizontally. So, the magnetic disk drive has a superior heat-radiation capability.

The conventional magnetic disk drive has a difficulty in which heats being generated from the disk enclosure and package respectively are hard to be radiated to the external air. Because, the disk enclosure and package are arranged such that the heat-radiation surfaces are opposite to face with each other, which causes heat accumulation to easily occur in a space between the heat-radiation surfaces. Due to the aforementioned arrangement in which the heat-radiation surfaces simply face with each other, heat-radiation areas should be reduced.

In contrast to the aforementioned magnetic disk drive, an overall heat-radiation surface of the magnetic disk drive which is effective for heat radiation can be increased by a single-side surface area of the package plus a single-side surface area of the disk enclosure.

As described above, the multipurpose spaces 115a, 115b of the magnetic disk drive contribute to both of thickness reduction and improvement of heat radiation in the magnetic disk drive.

Figure 11A:
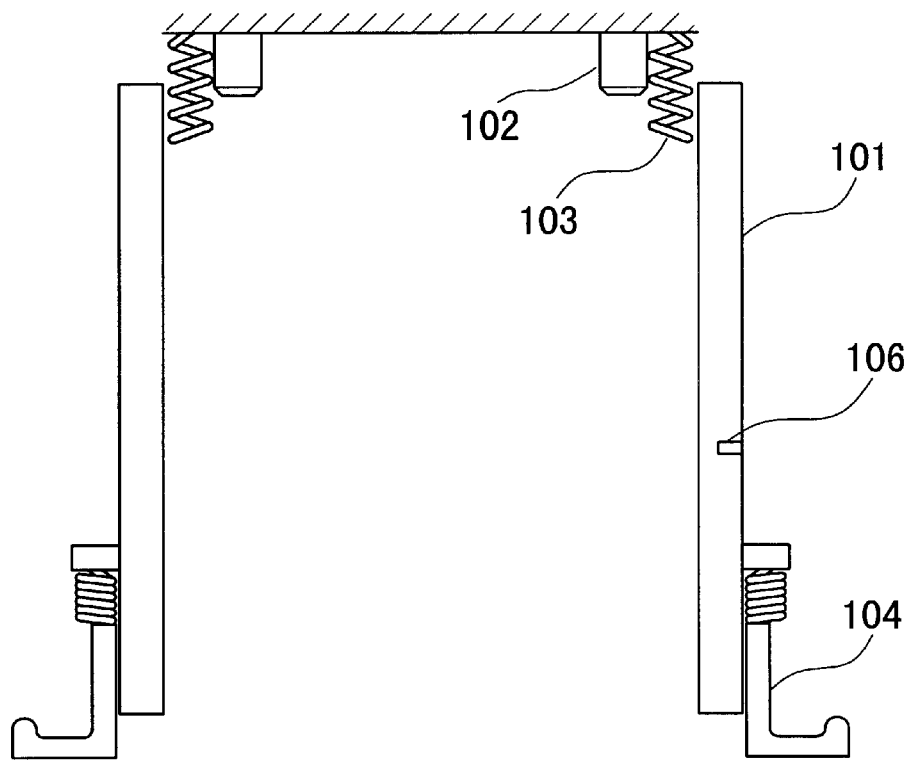
FIG. 11A is a schematic illustration showing selected parts of a main device, which are used for installation of the magnetic disk drive.
Figure 11B:
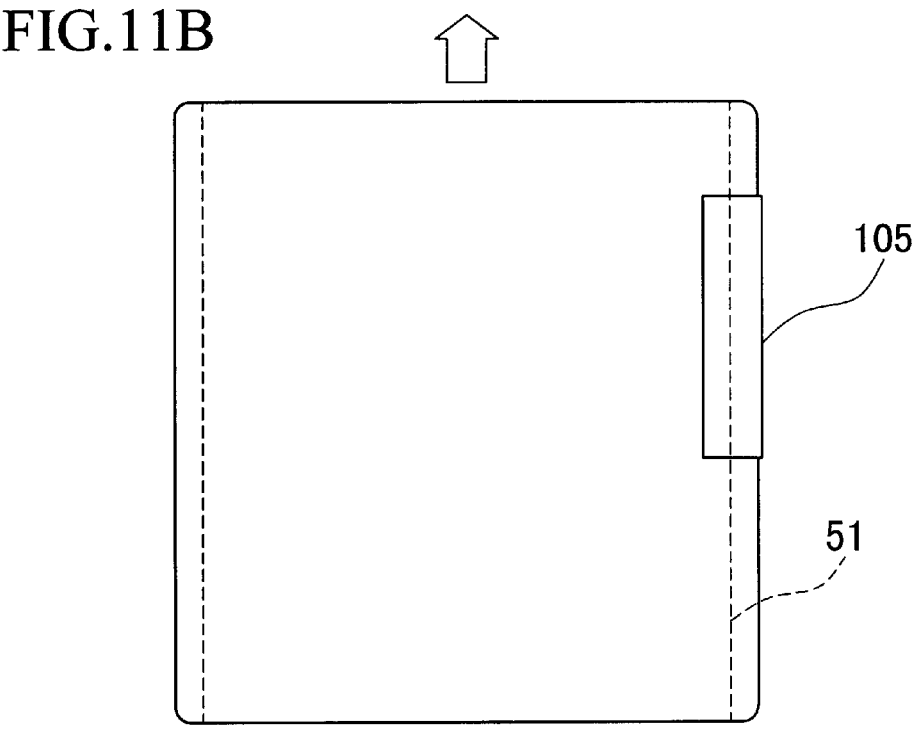
FIG. 11B is a plan view showing the magnetic disk drive of the embodiment 7 which is equipped with a shutter and which is to be inserted into the main device shown in FIG. 11A.
Figure 12:
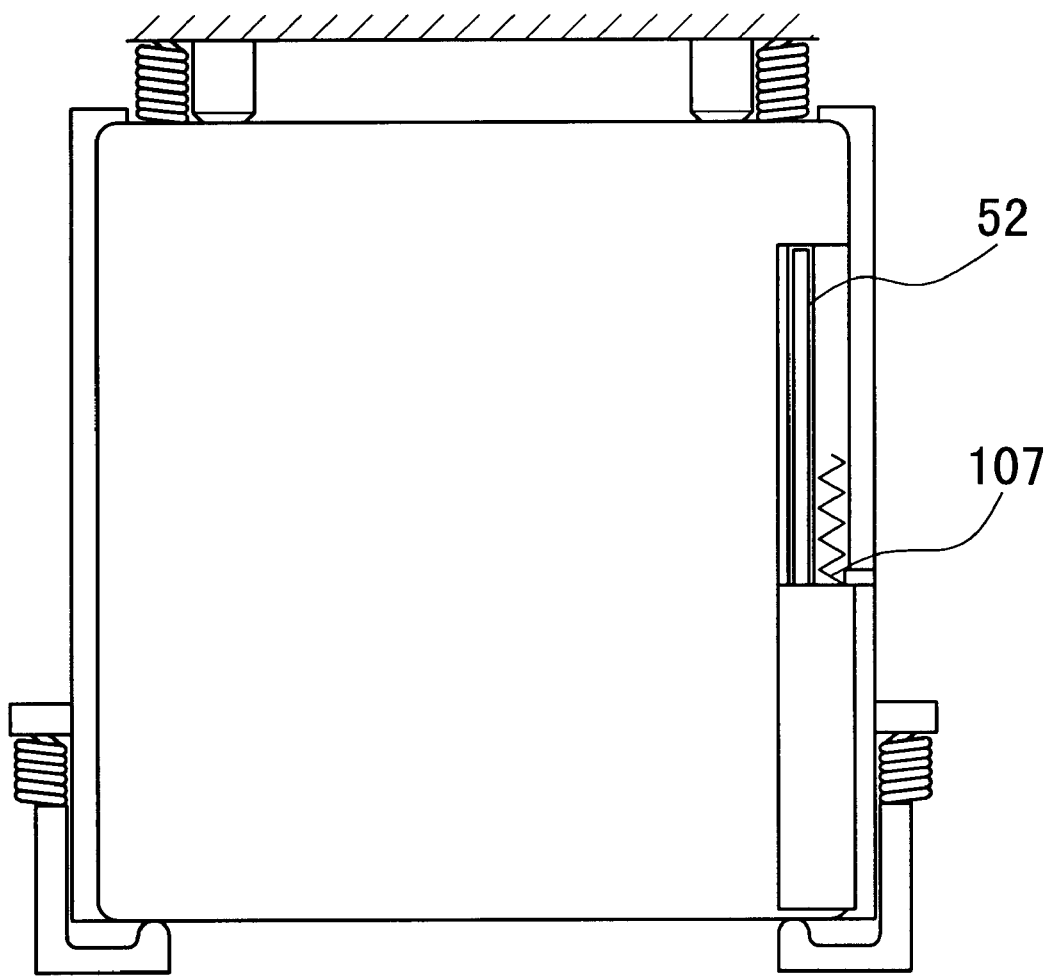
FIG. 12 is a schematic illustration showing that the magnetic disk drive of FIG. 11B is completely inserted and fixed in the main device of FIG. 11A.
Figure 13A:
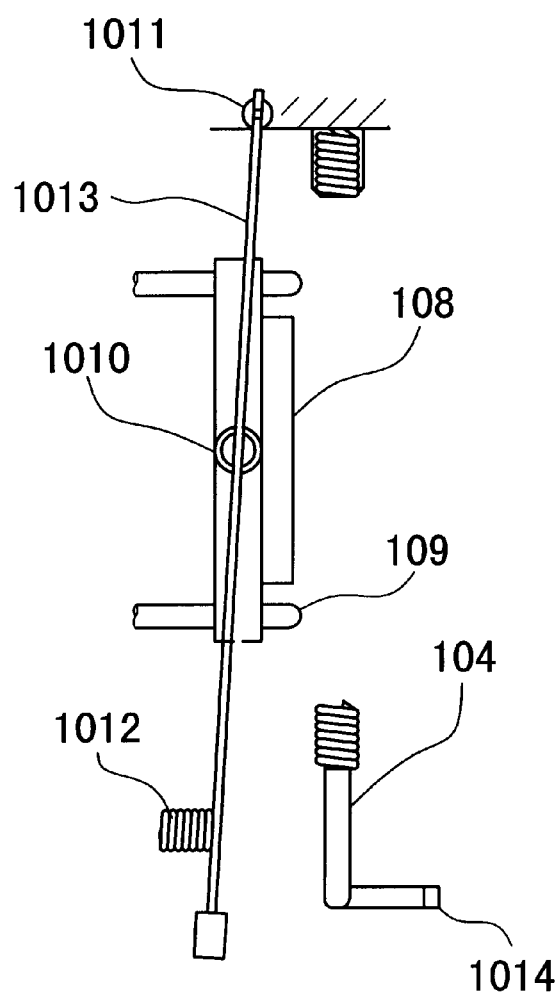
FIG. 13A is a schematic illustration showing selected parts of the main device in an initial state before installation of the magnetic disk drive.
Figure 13B:
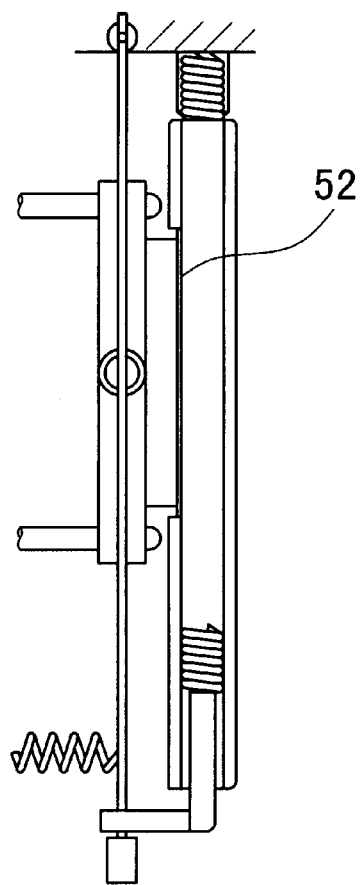
FIG. 13B is a schematic illustration showing the selected parts of the main device, in which the magnetic disk drive is installed so that a connector of the magnetic disk drive is connected to a terminal of the main device.

Next, a description will be given with respect to installation and extraction of the magnetic disk drive having the spaces 115a, 115b in the main device such as the personal computer, server and video device in conjunction with figures as follows:

FIGS. 11A and 11B show an initial state before the magnetic disk drive of this invention is installed in the main device. FIG. 12 shows a fixed state where the magnetic disk drive is installed and fixed in the main body. FIGS. 13A and 13B show operations to establish connection and disconnection of the connector, which are performed when the magnetic disk drive is installed in and extracted from the main device.

Specifically, the description will be given with respect to the aforementioned magnetic disk drive of the embodiment 7 (see FIGS. 6A and 6B), which is installed and extracted in the main device.

As described before in conjunction with FIGS. 6A and 6B, the side rails 51 are respectively attached to the exterior walls of the spaces 115a, 115b of the magnetic disk drive of the embodiment 7. In addition, a shutter 105 shown in FIG. 11B is provided outside of the side rail 51.

As shown in FIG. 11A, the main body is equipped with a pair of guide mechanisms, each of which is constructed by a guide 101, a pin 102, an eject spring 103 and a damper 104. Herein, the pin 102 is used for positioning of the magnetic disk drive being installed. The eject spring 103 works to generate force for ejection of the magnetic disk drive being extracted from the main device. The damper 104 is used to clamp the magnetic disk drive inside of the main device. In addition, a hook 106 is provided for one guide mechanism corresponding to the side rail 51 equipped with the shutter 105.

At an installation mode, the magnetic disk drive is inserted into the main device such that the side rails 51 slide along the guides 101, wherein the magnetic disk drive is pressed deeply into the main device until an end of the magnetic disk drive comes in contact with the pins 102 as shown in FIG. 12. Then, the dampers 104 are revolved and are placed in locked states. In this case, the hook 106 stops the shutter 105 of the magnetic disk drive, so that the shutter 105 slides back to partially open an interior portion of the magnetic disk drive. Thus, the connector 52 used for connection with the main device is exposed.

Incidentally, the damper 104 is of a spring type. Herein, the damper 104 is pulled back, revolved and then released by a hand. Thus, the damper 104 locks the magnetic disk drive inside of the main body.

The (anti-insertion) pin 102 plays an important role in positioning of the rubber connector being connected to the magnetic disk drive. The rubber connector is designed such that terminals of signal lines are arranged with equal pitches of 1 mm while each terminal is formed in a square shape whose side corresponds to 5 mm for example. For this reason, it is necessary to establish the accurate positioning, whose accuracy ranges between ±0.1 mm and ±0.2 mm between terminals of the magnetic disk drive and terminals of the main device.

At an extraction mode of the magnetic disk drive being extracted from the main device, the dampers 104 are returned to released states. Thus, the magnetic disk drive is pressed outside of the main device due to eject force of the eject springs 103. At the same time, the shutter 105 is closed due to restoration of a spring 107, which is provided inside of the magnetic disk drive.

With reference to FIGS. 13A and 13B, a description will be given with respect to operations to establish connection and disconnection of the connector, which are performed when the magnetic disk drive is installed in and extracted from the main device.

As shown in FIG. 13A, a terminal 108 of the main device is attached to a frame 1013 by way of a rotary bush 1010. Normally, the frame 1013 is pulled up toward a ceiling by a spring 1012.

When the terminal 108 is connected to the connector 52 of the magnetic disk drive, in other words, when the terminal 108 is pressed against the rubber connector 52, a human operator (or user) pulls down the frame 1013, so that the frame 1013 rotates about an axis of a hinge 1011.

In the above, the terminal 108 rotates about the rotary bush 1010, so that the terminal 108 descends down along a guide pin 109. Function of the guide pin 109 may be similar to the foregoing (anti-insertion) pin 102.

When the terminal 108 sufficiently descends down to come in contact with the rubber connector 52, a clamp hook 1014 of the damper 104 is hooked on an end portion of the frame 1013, so that the terminal 108 is fixed in position, which is shown in FIG. 13B.

In order to release the connection between the terminal 108 and the rubber connector 52, the user merely revolves the hook 1014 of the damper 104 in an unlock direction.

Next, a description will be given with respect to a magnetic disk drive in accordance with embodiment 9 with reference to FIGS. 14A, 14B and 14C.

Figure 14A:
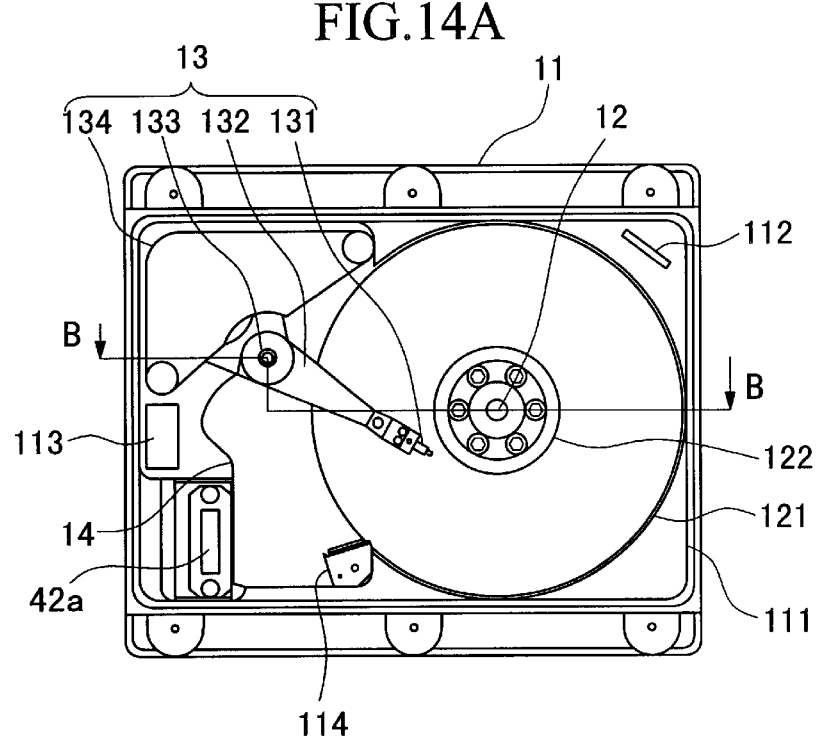
FIG. 14A is a plan view showing a construction of a magnetic disk drive, which is uncovered, in accordance with embodiment 9 of the invention.
Figure 14B:
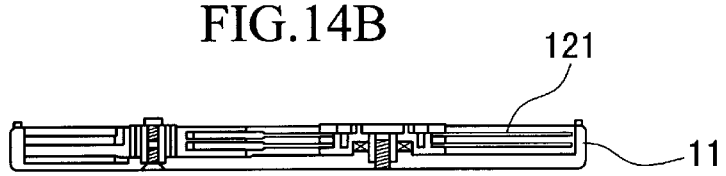
FIG. 14B is a cross sectional view taken along line B—B in FIG. 14A.
Figure 14C:
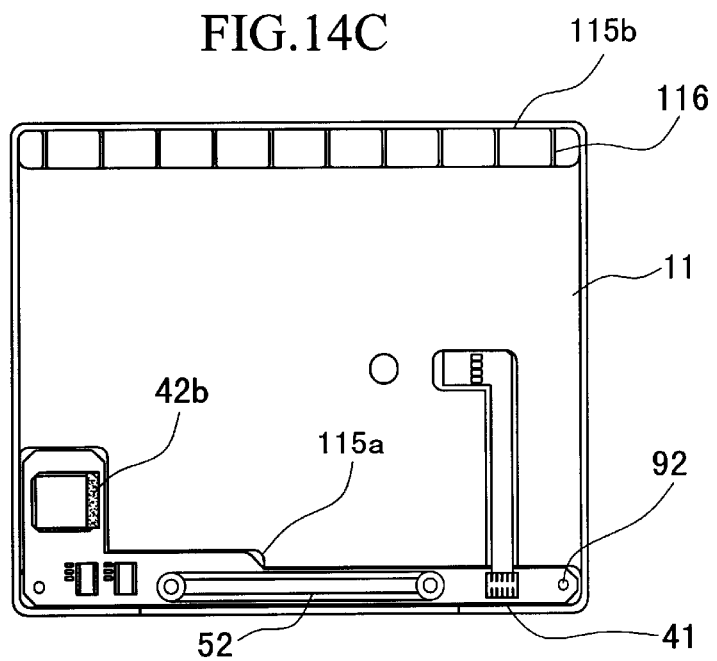
FIG. 14C is a bottom view showing a base of the magnetic disk drive of FIG. 14A.

Specifically, FIG. 14A is a plan view of the magnetic disk drive, which is uncovered; FIG. 14B is a cross sectional view of the magnetic disk drive; and FIG. 14C is a bottom view showing a base (11) of the magnetic disk drive, wherein parts equivalent to those shown in the foregoing figures will be designated by the same reference symbols.

First, a construction of the magnetic disk drive of the embodiment 9 will be described with reference to FIG. 14A.

In the magnetic disk drive of the embodiment 9, a spindle motor 12, an actuator 13 and a flexible printed-circuit board 14 are arranged on the base 11.

A medium 121 is attached to a spindle of the spindle motor 12 by means of a clamp ring 122.

The actuator 13 is constructed by a head 131, a multi-arm 132, a pivot bearing 133 and a voice coil motor 134.

The flexible printed-circuit board 14 is securely attached to the actuator 13 and the base 11 so as to perform transmission and reception with respect to positioning information as well as recording singals and reproduced signals.

In addition, the magnetic disk drive is equipped with a gasket 111 for enclosing the aforementioned mechanical parts, an air filter 112 for preventing dust from being entered and silicagel 113 for controlling humidity.

Further, the magnetic disk drive employs a head load/unload mechanism to refuge the head 131 outside of the medium 121 at a stop mode. Furthermore, a head refuge lamp 114 is arranged aside the medium 121.

The magnetic disk drive of the embodiment 9 employs a 3.5-inch magnetic disk as the medium 121. Actually, the magnetic disk drive installs two magnetic disks as shown in FIG. 14B.

Next, a backside construction of the magnetic disk drive will be described with reference to FIG. 14C.

Two spaces 115a, 115b are formed at two sides of the base 11. Each space has specific dimensions, in which width is 12 mm length is 140 mm and depth is 10 mm.

A package 41 mounting electronic components is attached to the space 115a by screws 92. The package 41 is electrically connected to the flexible printed-circuit board 14 by connectors 42a, 42b.

In general, the conventional package is large and is attached to an overall area of a back of a disk enclosure of a magnetic disk drive. In contrast, the embodiment 9 uses a small package having 12 mm width and 14 mm length. So, it is difficult to mount all of the electronic components conventionally used on such a small package.

Therefore, the present embodiment selectively mounts a limited number of the electronic components, which are required for the disk enclosure in itself, on the package 41. Concretely speaking, the package 41 mounts only the RW channels, EEPROM, AD converter and connectors. So, there remains other electronic components such as the HDC (i.e., Hard Disk Controller), DMC (i.e., Drive Manager Chip) and SPM-VCM drivers, which are installed in the main device.

That is, the electronic components being normally mounted on the conventional package are divided into two sets of components, which are respectively installed in the magnetic disk drive and main device. In other words, the magnetic disk drive is equipped with a sub package mounting the selected components, while the main device is equipped with a main package mounting the other components.

Incidentally, it is possible to propose several ways for division of the electronic components used for the sub package and main package respectively. For example, it is possible to mount only a RW amplifier on the sub package.

The package 41 is electrically connected to the main device by the rubber connector 52.

To improve a heat-radiation capability, a number of heat-radiation frames 116 are formed in the space 115b. It is possible to set an arbitrary number of the heat-radiation frames 116. For convenience sake, the present embodiment uses ten heat-radiation frames 116.

Using the ten heat-radiation frames 116, it is possible to increase a total surface area used for heat radiation, as follows:

12 mm×10 mm×10×2 (sides)=2400 mm²

Figure 15A:
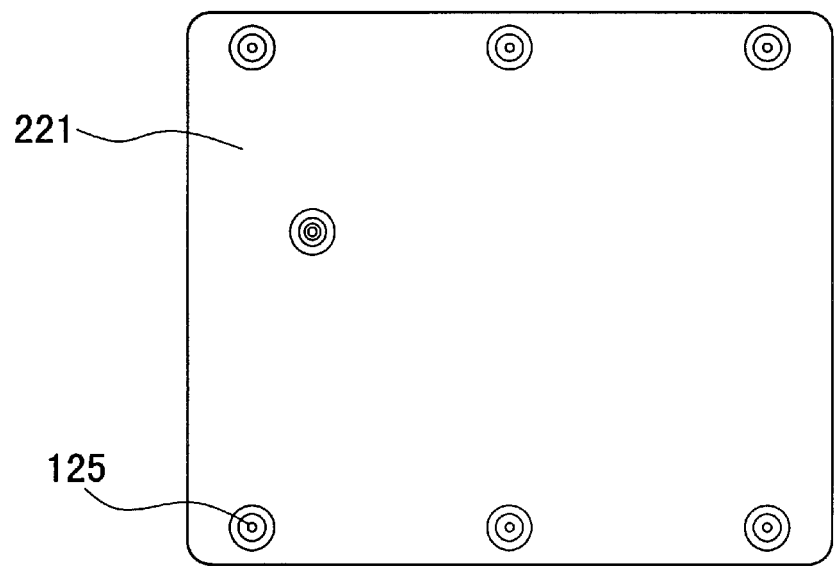
FIG. 15A is a plan view showing an exterior appearance of the magnetic disk drive, which is covered with a front cover.
Figure 15B:
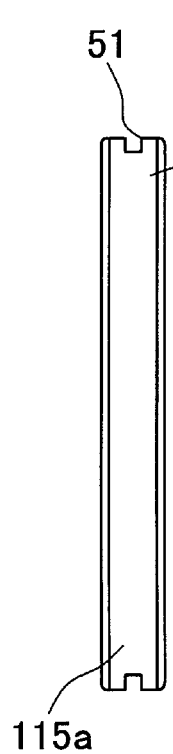
FIG. 15B is a side view of the magnetic disk drive to which a side rail is attached.
Figure 15C:
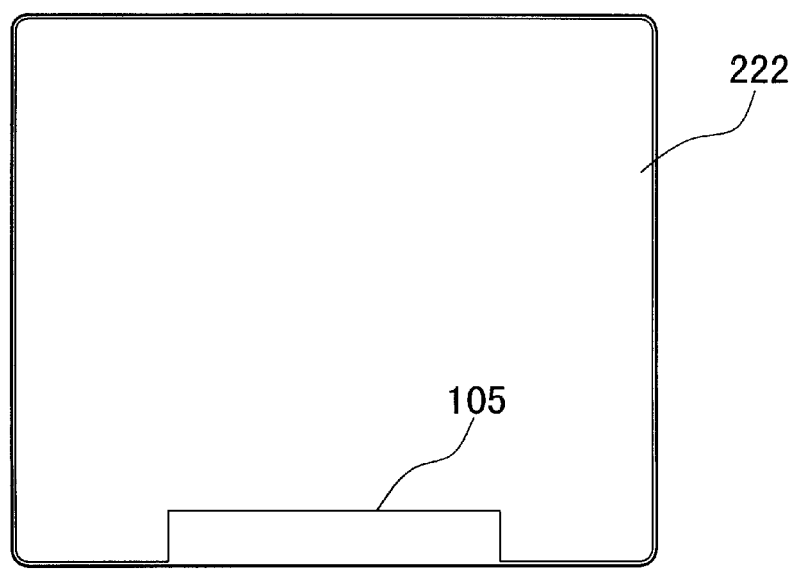
FIG. 15C is a bottom view of the magnetic disk drive which is equipped with a shutter.

Next, an exterior appearance of the magnetic disk drive will be described with reference to FIGS. 15A, 15B and 15C. Specifically, FIG. 15A is a plan view of the magnetic disk drive; FIG. 15B is a side view of the magnetic disk drive; and FIG. 15C is a bottom view of the magnetic disk drive.

First, a front-side appearance of the magnetic disk drive will be described with reference to FIG. 15A.

As shown in FIG. 15A, the magnetic disk drive is covered with a front cover 221, which is fixed thereto by screws 125 at six positions. The front cover 221 is provided to enclose the disk enclosure with the gasket 111. So, the front cover 221 is strongly fixed to the magnetic disk drive by the screws 125.

Incidentally, the front cover 221 is formed in a square shape having dimensions (i.e., width and length), which is expressed as 125 mm×142 mm. So, the size of the front cover 221 itself is identical to the size of the CD-ROM case.

Next, a side appearance of the magnetic disk drive will be described with reference to FIG. 15B.

As shown in FIG. 15B, a side rail 51 is formed on a side of the base 11 of the magnetic disk drive. The side rail 51 acts as a guide by which the magnetic disk drive is installed in the main device.

The present embodiment is designed based on assumption in which a frequency of installation and extraction of the magnetic disk drive in the main device ranges between ten times to twenty times within the life of the magnetic disk drive. In contrast, an average number of times for repetition of installation and extraction that the users perform with respect to the conventional magnetic disk drives is assumed to be under one time or so. Therefore, the conventional magnetic disk drives are not designed in consideration of the durability and sliding capability of the side rails. In the present embodiment, the side rail 51 is formed by chipping (or cutting) the base 11. For this reason, the side rail 51 is made of aluminum, which is identical to the material of the base 11.

Incidentally, the side rail 51 has a specific height, which is 12.7 mm.

Next, a backside appearance of the magnetic disk drive will be described with reference to FIG. 15C.

A back cover 222 is adhered to a back of the base 11 of the magnetic disk drive. The backside of the magnetic disk drive is not required to have a sealing structure. So, the back cover 222 is attached to the back of the magnetic disk drive by both-side adhesive tapes or else.

The rubber connector 52 is arranged in a back side of the magnetic disk drive to connect signals lines between the magnetic disk drive and main device. So, the shutter 105 is arranged at a selected part of the backside of the magnetic disk drive. Thus, the rubber connector 52, which is normally positioned inside of the magnetic disk drive, is exposed by the shutter 105, which is opened.

Next, a description will be given with respect to technical features of the magnetic disk drives within the scope of this invention.

First technical feature of this invention is a high heat-radiation capability of the magnetic disk drive. To explain it, thermal analysis is made with respect to the magnetic disk drive of the embodiment 9 shown in FIGS. 14A, 14B and 14C under prescribed conditions where the spindle motor 12 having the largest heating value and the electronic components mounted on the package 41 are regarded as heat sources of 80 degrees Celsius. Herein, temperature increases are calculated with respect to selected points of the magnetic disk drive. Results are as follows:

In the magnetic disk drive of the embodiment 9, maximum temperatures are calculated with respect to an external frame portion of the base 11 and are distributed in a range between 55.5 degrees Celsius and 59.0 degrees Celsius.

To compare with the aforementioned results of the embodiment 9 in heat radiation, calculations are also performed with respect to a magnetic disk drive which excludes the spaces 115a, 115b. In such a magnetic disk drive, maximum temperatures of the external frame portion of the base are increased and distributed in a higher range between 66.0 degrees Celsius and 69.5 degrees Celsius.

So, comparison is made between the aforementioned magnetic disk drives with respect to distributions of the maximum temperatures. Comparison results show that the magnetic disk drive of the embodiment 9 is capable of offering a remarkable effect in heat radiation, by which temperature increases are reduced by 10 degrees (Celsius) or more. Such a remarkable effect is obtained by a superior heat-radiation structure of the magnetic disk drive of the present embodiment, in which the spaces 115a, 115b are arranged in the base 11, the package 41 are arranged to substantially adjoin the disk enclosure, and the heat-radiation frames 116 are formed in the space 115b.

Second technical feature of this invention is reduction of the total thickness of the magnetic disk drive, which is accomplished by arranging the package 41 in the space 115a of the base 11.

In the embodiment 9, thickness of the package 41 overlaps with thickness of the disk enclosure. So, the thickness of the package 41 does not contribute to the total thickness of the magnetic disk drive at all. The embodiment 9 differs from the conventional magnetic disk drive in which the package is attached to the back of the disk enclosure in a laminated-structure manner. So, the present embodiment is capable of reducing the total thickness of the magnetic disk drive by the thickness of the package. Concretely speaking, it is possible to obtain a thickness reduction effect for reducing the prescribed thickness of 5 mm or so, which the package has in general.

Incidentally, the embodiment 9 also has a superior structure, which is suitable for installation and extraction of the magnetic disk drive in the main device. Basically, such a structure of the embodiment 9 is similar to the foregoing embodiment 7, hence, the description thereof will be omitted.

Next, it is possible to propose a variety of modifications with respect to the aforementioned embodiments, as follows:

(1) The aforementioned embodiments are described such that the multipurpose spaces 115a, 115b of the embodiment 1 (see FIGS. 1A and 1B) are used for different purposes. That is, the embodiments 2 and 3 (see FIGS. 2A and 2B) use the spaces for improvement of the impact resistance; the embodiments 4 and 5 (see FIGS. 3A and 3B) use the spaces for improvement of the heat radiation; the embodiment 6 (see FIGS. 4A and 4B) uses the space for installation of the package; and the embodiment 7 uses the spaces for installation and extraction of the magnetic disk drive in the main device. Herein, each embodiment uses the space(s) for a single purpose. However, it is possible to use the space(s) in a multipurpose manner. That is, the spaces 115a, 115b can be used for improvement of the heat radiation and the installation of the package as well as the installation and extraction of the magnetic disk drive in the main device. So, it is possible to simultaneously impart multiple functions to the spaces 115a, 115b.

(2) In the embodiments, the multipurpose spaces 115a, 115b are arranged at different portions of the base 11 in its length direction. However, it is possible to arrange the spaces at different portions of the base in its width direction. In the embodiments, each of the spaces has a uniform size and shape, wherein an equal balance is set to the spaces. However, it is possible to enlarge one space to be larger than another space. Or, it is possible to provide only one space. So, it is possible to set an arbitrary balance to the spaces. Lastly, it is possible to summarize effects and technical features of the magnetic disk drives within the scope of the invention, as follows:

(1) The base of the magnetic disk drive is extended in both sides of the disk enclosure enclosing the mechanical parts such as the spindle motor and actuator, so that multipurpose spaces are formed in the extended sides of the base. Those spaces are used for multiple purposes. That is, it is possible to provide the spaces with the damper function for improvement of the impact resistance, heat-radiation structure for prevention of the temperature increase, and installation of the package mounting the electronic components. In addition, the spaces can be used for the installation/extraction mechanism of the magnetic disk drive in the main device.

(2) It is possible to improve the impact resistance of the magnetic disk drive. Because, the magnetic disk drive of this invention can be designed without consideration of the standard dimensions such that the shockabsorber mechanism corresponding to the shock absorbers can be arranged with respect to the multipurpose spaces. Due to the shockabsorber mechanism, it is possible to secure sufficient impact resistance with respect to the magnetic disk drive.

(3) It is possible to improve the heat-radiation capability of the magnetic disk drive. Because, as compared with the conventional magnetic disk drive in which the heat-radiation structure is designed within the standard dimensions, the magnetic disk drive of this invention is capable of increasing the total surface area of the base multiple times due to provision of the multipurpose spaces. By the multipurpose spaces equipped with the heat-radiation structure, it is possible to provide a base structure which is superior in heat radiation. Because of improvement of the heat radiation, it is possible to eliminate necessity in provision of a fan for cooling down the magnetic disk drive. Therefore, it is possible to eliminate vibration and noise due to the fan. Further, it is unnecessary to provide the magnetic disk drive with the thermal conductive members used for heat radiation. Thus, it is possible to reduce the cost required for provision of the thermal conductive members.

(4) The package is arranged in the multipurpose space and is aligned with the disk enclosure. As compared with the conventional magnetic disk drive in which the disk enclosure and package are arranged in a laminated-structure manner, it is possible to improve heat radiation of the magnetic disk drive. In addition, it is possible to reduce the total thickness of the magnetic disk drive. Because, the package is stored in the multipurpose space and is arranged horizontally with the disk enclosure. So, as compared with the conventional magnetic disk drive, it is possible to reduce the total thickness of the magnetic disk drive by the thickness of the package.

(5) The package of the magnetic disk drive is hard to be damaged or destructed. Because, the package is completely stored in the multipurpose space and is covered with the back cover, so that the package is not exposed. For this reason, the user does not directly touch the electronic components of the package with his or her hand(s). So, the electronic components mounted on the package are hard to be damaged by electrostatic destruction. In addition, it is possible to improve portability of the magnetic disk drive as well as value of the magnetic disk drive as merchandise. Because, the electronic components are not apparently exposed. So, the magnetic disk drive has an attractive look and is easy to handle with a hand (or hands) of the user.

(6) It is possible to easily perform installation and extraction of the magnetic disk drive in the main device. Because, the magnetic disk drive being inserted in the main device is guided by guides which are formed using the multipurpose spaces. Therefore, the user is capable of easily inserting the magnetic disk drive in the main device. Incidentally, it is preferable to use a rubber connector for establishing connection between the magnetic disk drive and main device. Herein, the rubber connector is advantageous in that the user does not need strong force to insert and extract it.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A magnetic disk drive comprising:
a first enclosed space defined by two side walls adjoining an upper wall and a lower wall;
at least one magnetic disk which is a magnetic recording medium;
a spindle motor for driving the magnetic disk to rotate about a spindle thereof;
a magnetic head for performing recording and reproduction of information on a surface of the magnetic disk;
an actuator for driving the magnetic head to be subjected to positioning,
the magnetic disk, magnetic head, and actuator housed within the first enclosed space;
a base with a horizontal surface for installing mechanical parts corresponding to the magnetic disk, the spindle motor, the magnetic head and the actuator, the two side walls, the upper wall, and the lower wall being mounted perpendicular to the horizontal surface of the base, the base horizontally extending in both sides beyond the upper and lower walls; and multipurpose spaces supported by the base and partitioned off from the first space by either the upper wall or the lower wall and are defined by an enclosed, continuous perimeter wall that includes either the upper wall or the lower wall.

2. A magnetic disk drive according to claim 1 wherein at least one of the multipurpose spaces is equipped with an impact elimination mechanism.

3. A magnetic disk drive according to claim 1 wherein at least one of the multipurpose spaces is equipped with a heat-radiation mechanism.

4. A magnetic disk drive according to claim 1 wherein one of the multipurpose spaces is used to store a package mounting electronic components.

5. A magnetic disk drive according to claim 1 wherein one of the multipurpose spaces is used to store a package mounting electronic components and is covered with a cover.

6. A magnetic disk drive according to claim 1 wherein guides are formed with respect to the multipurpose spaces and are used for installation into a main device.

7. A magnetic disk drive according to claim 1 wherein one of the multipurpose spaces is used to store a package mounting electronic components, and wherein guides are formed with respect to the multipurpose spaces and are used for installation into a main device.

8. A magnetic disk drive according to claim 1 wherein the multipurpose space is used to store a package mounting electronic components and is covered with a cover, and wherein guides are formed with respect to the multipurpose spaces and are used for installation into a main device.

9. A magnetic disk drive comprising:

a printed-circuit board mounting a first control and a second control;

at least one magnetic disk;

a spindle motor for driving the magnetic disk to rotate about a spindle thereof;

an actuator containing a magnetic head which is subjected to positioning on the magnetic disk under the first control and which reads or writes information on the magnetic disk under the second control;

a base which is extended in both sides thereof to provide at least two multipurpose spaces; and a package mounting electronic components, which is stored in one of the multipurpose spaces, wherein the printed-circuit board and the package are electrically connected together by connectors, the base supports a first space housing the magnetic disk, the spindle motor, and the actuator, as well as the at least two multipurpose spaces, and the multipurpose spaces are partitioned off from the first space by a partitioning wall and the multipurpose spaces are defined by an enclosed perimeter wall that includes the partitioning wall.

10. A magnetic disk drive according to claim 9 wherein the multipurpose spaces are equipped with a shockabsorber mechanism.

11. A magnetic disk drive according to claim 9 wherein the multipurpose spaces are equipped with a heat-radiation mechanism.

12. A magnetic disk drive according to claim 9 wherein the package is equipped with a rubber connector used for electrical connection with a main device.

13. A magnetic disk drive according to claim 12 wherein the base is covered with a back cover, by which the electronic components of the package are shielded and which is equipped with a shutter being opened to expose the rubber connector.

14. A magnetic disk drive according to claim 9 wherein the base is covered with a back cover, by which the electronic components of the package are shielded.

15. A magnetic disk drive according to claim 9 wherein a side rail is formed on an exterior wall of the multipurpose space and is used for installation into a main device.

16. A magnetic disk drive, comprising:

a housing partitioned by vertical walls into a central enclosed space, an upper enclosed multipurpose space and a lower enclosed multipurpose space, the central space and the upper multipurpose space being defined by enclosed, continuous perimeter walls that have a common shared wall that separates the upper multipurpose space from the central space, and the lower multipurpose space being defined by an enclosed, continuous perimeter wall and having a common shared wall that separates the lower multipurpose space from the central space; and a magnetic disk, a spindle motor, and an actuator mounted on a horizontal base within the central space, the vertical walls being perpendicular to the horizontal base.

17. The magnetic disk drive of claim 16, wherein the upper and lower multipurpose spaces are of equal size and extend along an entire length of the housing.

18. The magnetic disk drive of claim 16, wherein the upper multipurpose space is of a rectangular shape and the lower multipurpose space is L-shaped.

19. The magnetic disk drive of claim 16, wherein the upper and lower multipurpose spaces are rectangularly-shaped and extend along an entire length of the housing.

20. The magnetic disk drive of claim 16, wherein, the central space is enclosed by four walls, the upper multipurpose space is enclosed by four walls including the shared wall that separates the upper multipurpose space from the central space, and the lower multipurpose space is enclosed by four walls including the shared wall that separates the lower multipurpose space from the central space.

* * * * *